US009613261B2

(12) United States Patent
Wilson et al.

(10) Patent No.: US 9,613,261 B2
(45) Date of Patent: Apr. 4, 2017

(54) INFERRING SPATIAL OBJECT DESCRIPTIONS FROM SPATIAL GESTURES

(71) Applicant: Microsoft Technology Licensing, LLC, Redmond, WA (US)

(72) Inventors: Andrew David Wilson, Redmond, WA (US); Christian Holz, Berlin (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/457,048

(22) Filed: Aug. 11, 2014

(65) Prior Publication Data

US 2015/0030236 A1    Jan. 29, 2015

Related U.S. Application Data

(62) Division of application No. 13/098,387, filed on Apr. 29, 2011, now Pat. No. 8,811,719.

(51) Int. Cl.
*G06K 9/00* (2006.01)
*G06T 17/00* (2006.01)
(Continued)

(52) U.S. Cl.
CPC ... *G06K 9/00355* (2013.01); *G06F 17/30277* (2013.01); *G06T 17/00* (2013.01);
(Continued)

(58) Field of Classification Search
None
See application file for complete search history.

(56) References Cited

U.S. PATENT DOCUMENTS

| 5,875,257 A | 2/1999 | Marrin et al. |
| 6,215,890 B1 | 4/2001 | Matsuo et al. |

(Continued)

FOREIGN PATENT DOCUMENTS

| CN | 1753030 A | 3/2006 |
| CN | 201280020747 | 10/2013 |

(Continued)

OTHER PUBLICATIONS

Perng, Kuo-Luen, et al. "A real-time 3D virtual sculpting tool based on modified marching cubes." Proceedings of the International Conference on Artificial Reality and Tele-Existence. 2001. 10 pages.*

(Continued)

*Primary Examiner* — Sumati Lefkowitz
*Assistant Examiner* — Ryan P Potts

(57) ABSTRACT

Three-dimensional (3-D) spatial image data may be received that is associated with at least one arm motion of an actor based on free-form movements of at least one hand of the actor, based on natural gesture motions of the at least one hand. A plurality of sequential 3-D spatial representations that each include 3-D spatial map data corresponding to a 3-D posture and position of the hand at sequential instances of time during the free-form movements may be determined, based on the received 3-D spatial image data. An integrated 3-D model may be generated, via a spatial object processor, based on incrementally integrating the 3-D spatial map data included in the determined sequential 3-D spatial representations and comparing a threshold time value with model time values indicating numbers of instances of time spent by the hand occupying a plurality of 3-D spatial regions during the free-form movements.

20 Claims, 16 Drawing Sheets

(51) Int. Cl.
*G06F 17/30* (2006.01)
*G06T 7/00* (2017.01)

(52) U.S. Cl.
CPC ........ *G06T 7/0051* (2013.01); *G06T 2200/08* (2013.01); *G06T 2210/56* (2013.01)

(56) References Cited

U.S. PATENT DOCUMENTS

| | | | |
|---|---|---|---|
| 8,811,719 | B2 | 8/2014 | Wilson et al. |
| 2003/0023614 | A1 | 1/2003 | Newstrom et al. |
| 2006/0114252 | A1 | 6/2006 | Ramani et al. |
| 2006/0210146 | A1 | 9/2006 | Gu |
| 2008/0040692 | A1 | 2/2008 | Sunday et al. |
| 2008/0059578 | A1* | 3/2008 | Albertson ............... G06F 3/016 709/204 |
| 2009/0021514 | A1 | 1/2009 | Klusza |
| 2009/0077504 | A1 | 3/2009 | Bell et al. |
| 2009/0091568 | A1 | 4/2009 | Ravada et al. |
| 2010/0049629 | A1 | 2/2010 | Rathod et al. |

FOREIGN PATENT DOCUMENTS

| | | |
|---|---|---|
| CN | 103493104 | 1/2014 |
| EP | 12777241 | 10/2013 |
| EP | 2702566 | 3/2014 |
| HK | 14105756 | 6/2014 |
| HK | 1192790 | 8/2014 |
| JP | 10063461 A | 3/1998 |
| JP | 2005321966 A | 11/2005 |
| JP | 2006040271 A | 2/2006 |
| JP | 2006520948 A | 9/2006 |
| JP | 2009505288 A | 2/2009 |
| JP | 2014508167 | 10/2013 |
| JP | 2014-517957 A | 7/2014 |
| KR | 10-2013-7028458 | 10/2013 |
| KR | 10-2014-0023329 | 2/2014 |
| WO | 2007021996 A2 | 2/2007 |
| WO | 2010006087 A1 | 1/2010 |
| WO | US12/35702 | 4/2012 |
| WO | WO2012/149501 A2 | 11/2012 |

OTHER PUBLICATIONS

Li, Frederick WB, Rynson WH Lau, and Frederick FC Ng. "VSculpt: a distributed virtual sculpting environment for collaborative design." IEEE Transactions on Multimedia 5.4 (2003): 570-580. 11 pages.*
Shaw, Chris D., and Mark Green. "THRED: a two-handed design system." Multimedia Systems 5.2 (1997): 126-139. 14 pages.*
Schkolne, Steven, Michael Pruett, and Peter Schroder. "Surface drawing: creating organic 3D shapes with the hand and tangible tools." Proceedings of the SIGCHI conference on Human factors in computing systems. ACM, 2001. 8 pages.*
Baddeley, et al., "Working Memory", In G.H. Bower (Ed.), The Psychology of Learning and Motivation: Advances in Research and Theory 8, (1974), pp. 47-89.
Baudel, et al., "Charade: Remote Control of Objects using Free-hand Gestures", Available on Jan. 19, 2011 at <<http://citeseerx.ist.psu.edu/viewdoc/download;jsessionid=21F5D6053B98BD4029C51DFDFD91AA78?doi=10.1.1.21.5996&rep=rep1&type=pdf>>, (CACM 36, 7(1993), 28-35), (10 pages).
Billinghurst, et al., "Spatial Information Displays on a Wearable Computer", Available on Jan. 19, 2011 at <<http://ieeexplore.ieee.org/stamp/stamp.jsp?tp=&arnumber=734976>>, IEEE CG&A 18, Nov./Dec. 1998, pp. 24-30.
Bohus, et al., "Dialog in the Open World: Platform and Applications", Available on Jan. 19, 2011 at <<http://research.microsoft.com/en-us/um/people/dbohus/docs/open_world_icmi.pdf>>, Proc. ICMI '09, Nov. 2-4, 2009, pp. 31-38.

Deering, Michael F., "HoloSketch: A Virtual Reality Sketching/Animation Tool", Available on Jan. 19, 2011 at <<http://www.cparity.com/projects/AcmClassification/samples/210087.pdf>>, ACM Transactions on Computer-Human Interaction, vol. 2, No. 3, Sep. 1995, pp. 220-238.
Funkhouser, et al., "Modeling by Example", Available on Jan. 19, 2011 at <<http://www.cs.princeton.edu~funk/sig04a.pdf>>, ACM Transactions on Graphics (TOG), Proceedings of ACM SIGGRAPH 2004 TOG Homepage, vol. 23 Issue 3, Aug. 2004, pp. 652-663.
Funkhouser, et al., "A Search Engine for 3D Models", Available on Jan. 19, 2011 at <<http://www.cs.princeton.edu/~funk/tog03.pdf>>, ACM Transactions on Graphics, vol. 22 Issue 1, Jan. 2003, pp. 83-105.
Galyean, et al., "Sculpting: An Interactive Volumetric Modeling Technique", Available on Jan. 19, 2011 at <<http://www.cs.brown.edu~jfh/papers/Galyean-SAI-1991/paper.pdf>>, Computer Graphics, vol. 25, No. 4, Jul. 1991, pp. 267-274.
Grice, Paul, Studies in the Way of Words. Harvard University Press, 1989, 394 pages, Cambridge.
Gustafson, et al., "Imaginary Interfaces: Spatial Interaction with Empty Hands and Without Visual Feedback", Available on Jan. 19, 2011 at <<http://www.patrickbaudisch.com/publications/2010-GustafsonBaudisch-UIST10-ImaginaryInterfaces.pdf>>, In Proceedings of the Symposium on User Interface Software and Technology (UIST '10), Oct. 3-6, 2010, ACM, pp. 3-12, New York, USA.
Hinckley, et al., "Attention and Visual Feedback: the Bimanual Frame of Reference", Available on Jan. 19, 2011 at <<http://research.microsoft.com/en-us/um/people/kenh/papers/BimanRef.pdf>>, Symposium on Interactive 3D Graphics, 1997, pp. 121-126.
Hinckley, et al., "A Survey of Design Issues in Spatial Input", Available on Jan. 19, 2011 at <<http://research.microsoft.com/pubs/68463/survey.pdf>>, Proc. ACM UIST'94 Symposium on User Interface Software & Technology, Apr. 1994, pp. 213-222.
Hwang, et al., "A Full-Body Gesture Database for Automatic Gesture Recognition", Available on Jan. 19, 2011 at <<http://ieeexplore.ieee.org/stamp/stamp.jsp?tp=&arnumber=1613027>>, Proceedings of the 7th International Conference on Automatic Face and Gesture Recognition (FGR'06), IEEE, 2006, pp. 243-248.
Keefe, et al., "CavePainting: A Fully Immersive 3D Artistic Medium and Interactive Experience", Available on Jan. 19, 2011 at <<http://www.dgp.toronto.edu/~tomer/store/papers/cavepainting.pdf>>, Proc. I3D '01, ACM, 2001, pp. 85-93, USA.
Kendon, A., "How Gesture Can Become Like Words". Cross-Cultural Perspectives in Nonverbal Communication, C. H. Hogrefe, 1988, pp. 131-141, Toronto.
Lee, at al., "Model-based Analysis of Hand Posture", Available on Jan. 19, 2011 at <<http://ieeexplore.ieee.org/stamp/stamp.jsp?tp=&arnumber=403831>>, IEEE Comput. Graph. Appl. 15, 5 (1995), pp. 77-86.
Llamas, et al., "Twister: A Space-warp Operator for the Two-handed Editing of 3D Shapes", Available on Jan. 19, 2011 at <<http://www.gvu.gatech.edu/~jarek/papers/Twister.pdf>>, ACM Trans Graph 22, 3 (2003), pp. 663-668.
McNeill, David, Hand and Mind: What Gestures Reveal about Thought, University of Chicago Press,1992, 416 pages, USA.
Nishino, et al., "3D Object Modeling Using Spatial and Pictographic Gestures". Proc. VRST '98, ACM, 1998, pp. 51-58.
"Oblong g-speak", Available on Jan. 19, 2011 at <<http://www.oblong.com>>, 1 page.
Pavlovic, et al., "Visual Interpretation of Hand Gestures for Human-computer Interaction: A Review", Available on Jan. 19, 2011 at <<http://ieeexplore.ieee.org/stamp/stamp.jsp?tp=&arnumber=598226>>, IEEE Transactions on Pattern Analysis and Machine Intelligence 19, 7 (1997), pp. 677-695.
Pratini, Edison, "New Approaches to 3D Gestural Modeling—the 3D Sketch Maker Project", Available on Jan. 19, 2011 at <<http://www.tkk.fi/events/ecaade/E2001presentations/16_04_pratini.pdf>>, Proc. eCAADe '01, pp. 466-471.
Sachs, et al., "3-Draw: A Tool for Designing 3D Shapes", Available on Jan. 19, 2011 at <<http://ieeexplore.ieee.org/stamp/stamp.jsp?tp=&arnumber=103389>>, IEEE Comput. Graph 11, 6 (1991), pp. 18-26.

(56) References Cited

OTHER PUBLICATIONS

Sato, et al., "Real-Time Input of 3D Pose and Gestures of a User's Hand and Its Applications for HCI", Available on Apr. 29, 2011 at <<http://www.hci.iis.u-tokyo.ac.jp/~ysato/papers/Sato-VR01.pdf>>, Proc. IEEE Virtual Reality Conference (IEEE VR2001), Mar. 2001, pp. 79-86.
Schkolne, et al., "Surface Drawing: Creating Organic 3D Shapes with the Hand and Tangible Tools", Available on Jan. 19, 2011 at <<http://www.multires.caltech.edu/pubs/chi01.pdf>>, Proc. CHI '01, Mar. 31-Apr. 4, ACM, 2001, pp. 261-268, Seattle, WA, USA.
Starner, et al., "The Gesture Pendant: A Self-illuminating, Wearable, Infrared Computer Vision System for Home Automation Control and Medical Monitoring", Available on Jan. 19, 2011 at <<http://ieeexplore.ieee.org/stamp/stamp.jsp?tp=&arnumber=888469>>, ISWC '00, Proceedings of the 4th IEEE International Symposium on Wearable Computers, IEEE, 2000, pp. 87-94.
Starner, et al., "The Perceptive Workbench: Computer-vision-based Gesture Tracking, Object Tracking, and 3D Reconstruction for Augmented Desks", Available on Jan. 19, 2011 at <<http://www.amyhurst.com/publications/starner-perceptive-mva03.pdf>>, Machine Vision and Appl. 14, 1 (2003), pp. 59-71.
Tangelder, "A Survey of Content based 3D Shape Retrieval Methods", Available on Jan. 19, 2011 at <<http://www.cs.uu.nl/groups/MG/multimedia/publications/art/mtap08.pdf>>, Multimedia Tools and Applications, 39, (2008), pp. 441-471.
Trigo, et al., "An Analysis of Features for Hand-Gesture Classification", Available on Jan. 19, 2011 at <<http://www.ic.uff.br/iwssip2010/Proceedings/nav/papers/paper_128.pdf>>,IWSSIP 2010—17th International Conference on Systems, Signals and Image Processing, Jun. 17-19, 2010, pp. 412-415, Rio de Janeiro, Brazil.
Wachs J.P., "Gaze, Posture and Gesture Recognition to Minimize Focus Shifts for Intelligent Operating Rooms in a Collaborative Support System", Available on Jan. 19, 2011 at <<http://www.journal.univagora.ro/download/pdf/396.pdf>>, Int. J. of Computers, Communications & Control, ISSN 1841-9836, E-ISSN 1841-9844 vol. V (2010), No. 1, 2010, pp. 106-124.
Wang, et al., "Volume Sculpting", Available on Jan. 19, 2011 at <<http://www.cs.sunysb.edu/~vislab/papers/p151-wang.pdf>>, Proc. I3D '95, ACM, 1995, pp. 151-214.
Willis, et al., "Spatial Sketch: Bridging between Movement & Fabrication", Available on Jan. 19, 2011 at <<http://www.designinterface.jp/projects/SpatialSketch/SpatialSketch12.pdf>>, Proceedings of the fourth international conference on Tangible, embedded, and embodied interaction (Proc. TEI '10), Jan. 25-27, 2010, ACM, pp. 5-12, USA.
Wilson, Andrew D. "Robust Computer Vision-based Detection of Pinching for One and Two-handed Gesture Input", Available on Jan. 19, 2011 at <<http://citeseerx.ist.psu.edu/viewdoc/download?doi=10.1.1.87.2715&rep=rep1&type=pdf>>, Proceedings of the 19th annual ACM symposium on User interface software and technology (UIST '06), Oct. 15-18, 2006, pp. 255-258.
Wu, et al., "View-independent Recognition of Hand Postures", Available on Apr. 29, 2011 at <<http://www.ifp.illinois.edu/~yingwu/papers/CVPR00c.pdf>>, In Proc. of IEEE Conf. on CVPR' 2000, vol. II, pp. 88-94, 2000, Hilton Head Island, SC, USA.
"Xbox Kinect", Available on Apr. 29, 2011 at <<http://www.xbox.com/kinect>>, 7 pages.
Zhang, Zhengyou, "Iterative Point Matching for Registration of Free-form Curves and Surfaces", Available on Jan. 19, 2011 at <<http://citeseerx.ist.psu.edu/viewdoc/download?doi=10.1.1.175.770&rep=rep1&type=pdf>>,Int. J. Comput. Vision 13, 2 (1994), pp. 119-152.
"International Search Report", Mailed Date: Nov. 7, 2012, Application No. PCT/US2012/035702, Filed Date: Apr. 28, 2012, pp. 9.
Holz, et al., "Data Miming: Inferring Spatial Object Descriptions from Human Gesture," Retrieved Dec. 24, 2012 at <<http://research.microsoft.com/en-us/um/people/awilson/publications/holzchi2011/holzchi2011.pdf>>, In Proceedings of the SIGCHI Conference on Human Factors in Computing Systems (CHI '11), May 7-12, 2011, pp. 811-820.
Chen, Ding-Yun. Ouhyoung, Ming. "A 3D Model Alignment and Retrieval System," Dec. 2002, In Proceedings of International Computer Symposium, Workshop on Multimedia Technologies, 9 pages.
Kaiser, Ed. Olwal, Alex. McGee, David. Benko, Hrvoje. Corradini, Andrea. Lie, Xiaoguang. Cohen, Phil. Feiner, Steven. "Mutual Disambiguation of 3D Multimodal Interaction in Augmented Reality and Virtual Reality," ICMI'03, Nov. 7, 2003, 8 pages.
"Office Action Issued in European Patent Application No. 12777241.6", Mailed Date: May 26, 2015, 6 Pages.
"Supplementary Search Report Issued in European Patent Application No. 12777241.6", Mailed Date: May 13, 2015, 3 Pages.
"First Office Action and Search Report Issued in Chinese Patent Application No. 201280020747.2", Mailed Date: Jun. 3, 2015, 16 Pages.
Response to First Office Action in Chinese Patent Application No. 201280020747.2, Submitted Date: Sep. 29, 2015, 23 Pages.
"Second Office Action and Search Report Issued in Chinese Patent Application No. 201280020747.2", Mailed Date: Jan. 14, 2016, 10 Pages.
Response to Second Office Action in Chinese Patent Application No. 201280020747.2, Submitted Date: Mar. 24, 2016, 23 Pages.
Response to Office Action Issued in European Patent Application No. 12777241.6, Mailed Date: May 26, 2015, Response submitted Jun. 30, 2015, 15 Pages.
Nishino,H., et al., "Deformable 3D Shape Representation using Bimanual Gestures," Transactions of Information Processing Society of Japan, vol. 40, No. 2, pp. 698-701, 1999.
"Written Opinion of the International Searching Authority", Mailed Date: Nov. 7, 2012, Application No. PCT/US2012/035702, Filed Date: Apr. 28, 2012, pp. 4.
"Office Action Issued in Japanese Patent Application No. 2014-508167", Mailed Date: Apr. 19, 2016, 9 Pages.

* cited by examiner

200B (2a)

┌─────────────────────────────────────────────────────────────┐
│ Receive audio data associated with at least one verbal indicator representing │
│ an utterance, wherein                                       │ 212
│ selecting at least one of the predetermined 3-D items is based on determining │
│ at least one of the database objects that is associated with at least one of the │
│ predefined 3-D models that matches the matches the integrated 3-D model, │
│ based on the verbal indicator                               │
└─────────────────────────────────────────────────────────────┘

(2b)

┌─────────────────────────────────────────────────────────────┐
│ Generate a first alignment of one of the predefined 3-D models and the │ 214
│ integrated 3-D model based on matching at least one component that is │
│ included in the one of the predefined 3-D models and the integrated 3-D │
│ model, based on scaling, translating, and rotating the one of the predefined 3- │
│ D models and the integrated 3-D model                       │
└─────────────────────────────────────────────────────────────┘

┌─────────────────────────────────────────────────────────────┐
│ Generate a second alignment of the one of the predefined 3-D models and │ 216
│ the integrated 3-D model based on an iterative closest point algorithm, based │
│ on the first alignment                                      │
└─────────────────────────────────────────────────────────────┘

(2c)

┌─────────────────────────────────────────────────────────────┐
│ Generate a first alignment of one of the predefined 3-D models and the │ 218
│ integrated 3-D model based on matching at least one component that is │
│ included in the one of the predefined 3-D models and the integrated 3-D │
│ model, based on scaling, translating, and rotating the one of the predefined 3- │
│ D models and the integrated 3-D model                       │
└─────────────────────────────────────────────────────────────┘

┌─────────────────────────────────────────────────────────────┐
│ Generate a second alignment of the one of the predefined 3-D models and │ 220
│ the integrated 3-D model based on a brute force alignment that includes a │
│ plurality of scales, rotations, and translations of the one of the predefined 3-D │
│ models and the integrated 3-D model, based on the first alignment │
└─────────────────────────────────────────────────────────────┘

FIG. 2B

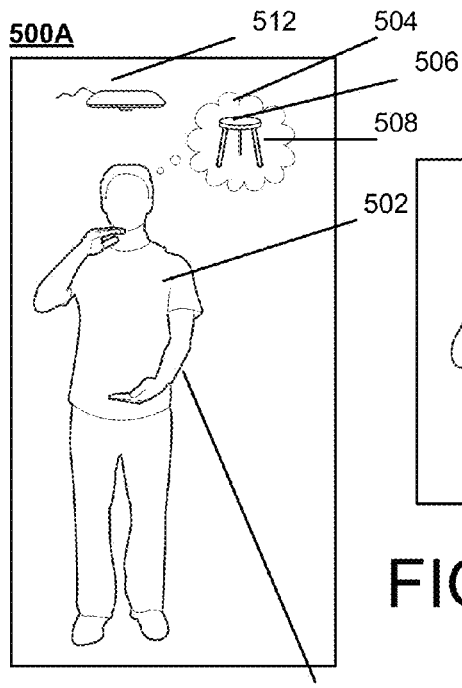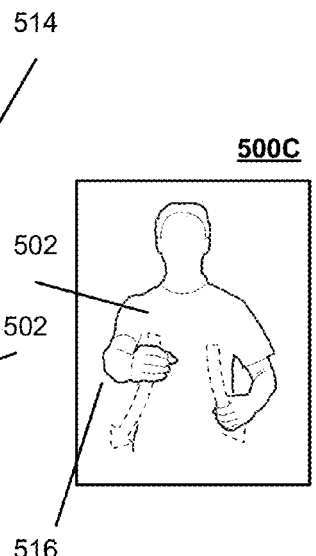
FIG. 5A  FIG. 5B  FIG. 5C
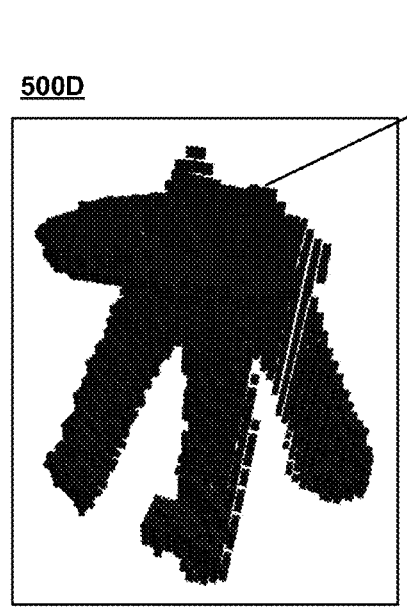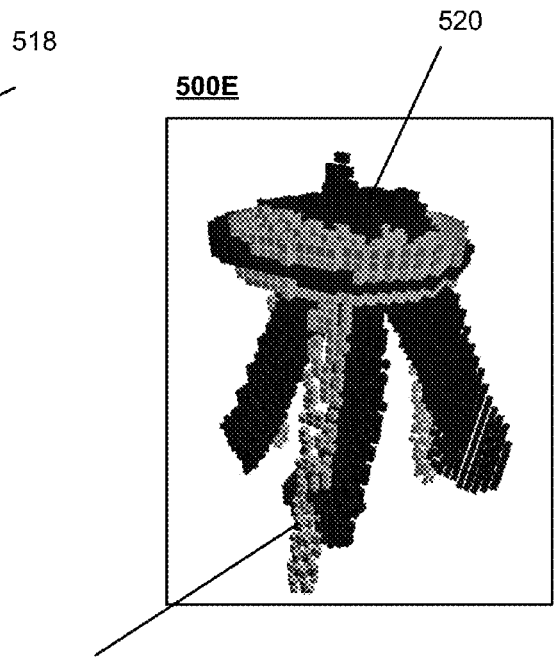
FIG. 5D  FIG. 5E

INFERRING SPATIAL OBJECT DESCRIPTIONS FROM SPATIAL GESTURES

CROSS-REFERENCE TO RELATED APPLICATION

This application is a divisional of, and claims benefit from, commonly assigned, co-pending U.S. patent application Ser. No. 13/098,387, with inventors Andrew David Wilson et al., filed Apr. 29, 2011, entitled "Inferring Spatial Object Descriptions from Spatial Gestures," the entirety of which is incorporated by reference herein.

BACKGROUND

Communication of shapes and dimensions of objects may be challenging for many humans. For example, in conversation many people may use hand gestures to assist in describing shapes, particularly when it may be cumbersome to describe with words alone. For example, the roofline of a new car may be communicated by a swoop of an outstretched hand, or a particular chair style may be indicated to a shopkeeper by a series of gestures that describe the arrangement of surfaces unique to that particular chair design. In such cases, the person communicating the information may often appear to trace a three-dimensional (3-D) shape of the described object. A listener may watch the gestures attentively, and may attempt to recreate the 3-D shape in his/her own mind.

Stores and warehouses may welcome shoppers with signs and/or customer service representatives offering help with inventory lookup. For example, a customer looking for a chair may request a brand name or style which the customer service representative may type into a keyboard attached to a warehouse inventory system, and may receive information regarding a store location of requested items, or an indication that the requested items are not available. If the shopper does not know/remember exact brand names or style names/numbers, the customer may try describing the desired items to the customer service representative to ascertain whether the representative may recall seeing such items in the inventory.

Many gaming environments offer players options of summoning particular objects into games. For example, players of war games may request particular weapons such as bows and arrows, nunchucks, brass knuckles, or various types of guns and cannons. These items may be programmed into the game before distribution to customers. As another example, a virtual community game may offer players options of items that they may incorporate into their particular desired virtual environment. For example, a user may set up a dinosaur zoo by selecting from an array of various dinosaurs and cages, as well as food and cleaning supplies, all of which may be pre-programmed into the game before distribution. For example, the user may select the desired items by reviewing lists of game inventory items and clicking, touching, or pointing to the desired items via an input device.

SUMMARY

According to one general aspect, a spatial object management engine may include a database access engine configured to initiate access to a database including a plurality of database objects, each database object associated with a predefined three-dimensional (3-D) model that simulates an appearance of a predetermined 3-D item. The spatial object management engine may also include an image data receiving engine configured to receive 3-D spatial image data associated with at least one arm motion of an actor based on free-form movements of at least one hand of the actor, based on natural gesture motions. The spatial object management engine may also include an integrated model generator configured to generate an integrated 3-D model based on integrating temporally sequential 3-D representations of the 3-D positioning of the at least one hand in accordance with the received 3-D spatial image data. The spatial object management engine may also include a matching engine configured to select, via a spatial object processor, at least one of the predetermined 3-D items, based on accessing the database access engine and determining at least one of the database objects that is associated with at least one of the predefined 3-D models that matches the integrated 3-D model.

According to another aspect, a computer program product tangibly embodied on a computer-readable medium may include executable code that, when executed, is configured to cause at least one data processing apparatus to receive three-dimensional (3-D) spatial image data associated with at least one arm motion of an actor based on free-form movements of at least one hand of the actor, based on natural gesture motions of the at least one hand. Further, the data processing apparatus may determine a plurality of sequential 3-D spatial representations that each include 3-D spatial map data corresponding to a 3-D posture and position of the at least one hand at sequential instances of time during the free-form movements, based on the received 3-D spatial image data. Further, the data processing apparatus may generate, via a spatial object processor, an integrated 3-D model based on incrementally integrating the 3-D spatial map data included in the determined sequential 3-D spatial representations and comparing a threshold time value with model time values indicating numbers of instances of time spent by the at least one hand occupying a plurality of 3-D spatial regions during the free-form movements.

According to another aspect, a computer program product tangibly embodied on a computer-readable medium may include executable code that, when executed, is configured to cause at least one data processing apparatus to receive three-dimensional (3-D) sensor data associated with at least one natural gesture of an actor based on free-form movements of the actor, based on natural gesture motions emulating an appearance of a predetermined three-dimensional (3-D) item. Further, the data processing apparatus may generate an integrated 3-D model based on integrating received 3-D sensor data that represents 3-D positioning of at least one 3-D moving object associated with the actor in accordance with the free-form movements. Further, the data processing apparatus may determine, via a spatial object processor, a predefined 3-D model associated with a database object that matches the integrated 3-D model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 2A-2D are a flowchart illustrating example operations of the system of FIGS. 1A-1B.

FIGS. 5A-5E illustrate example gesture movements and example models associated with the gesture movements.

DETAILED DESCRIPTION

Figure 1A:
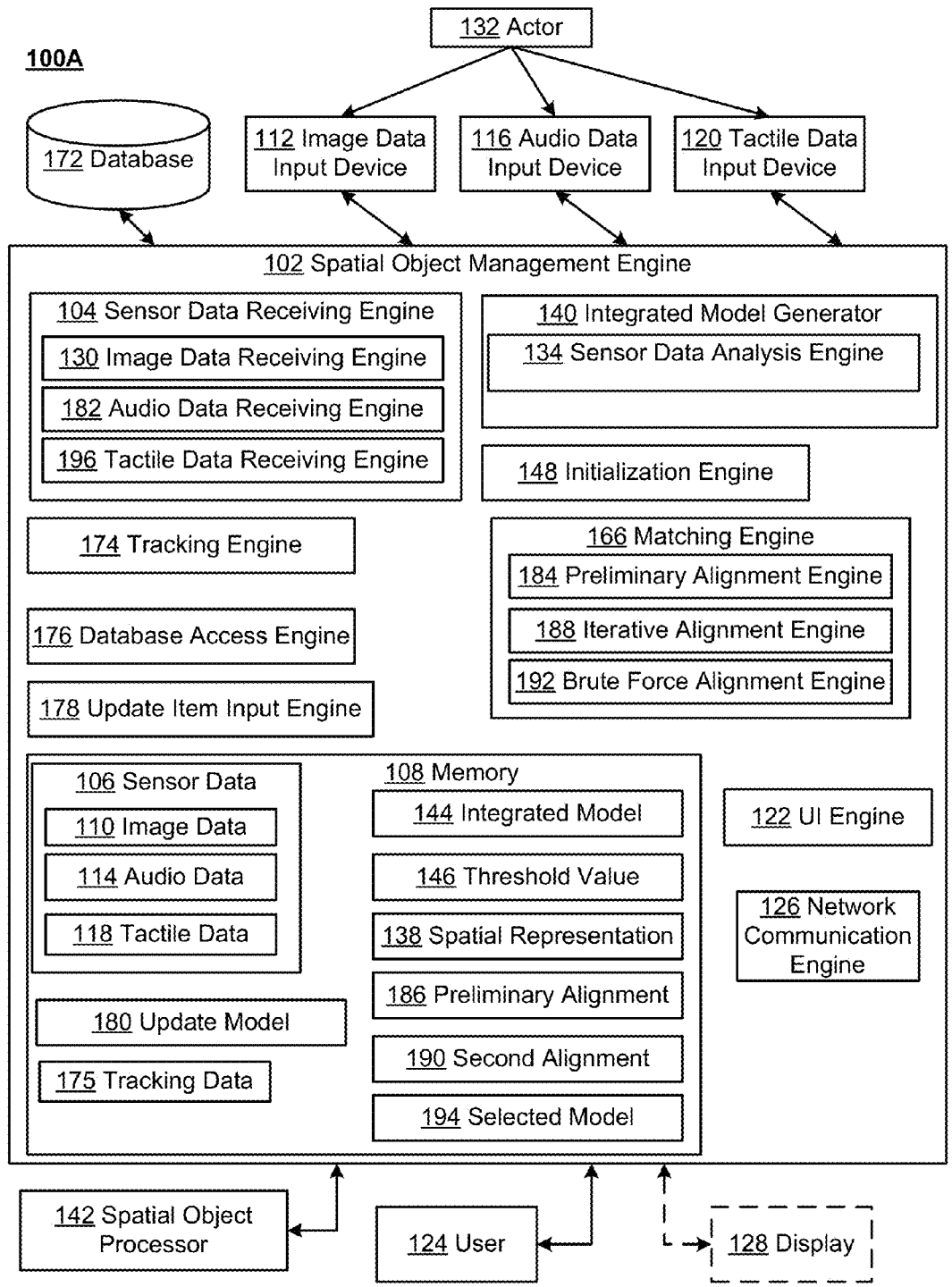
FIG. 1A is a block diagram of an example system for spatial object management.

Speakers often use hand gestures when talking about or describing physical objects. For example, such gestures may aid the speaker in conveying distinctions of shape that may be difficult to describe verbally. Techniques described herein may be used, for example, to provide gesture-based description functionality for generating three-dimensional (3-D) models that may emulate an appearance of a 3-D item envisioned by a gesturing person. For example, a customer at a retail outlet may wish to determine whether the outlet may have a particular item in its current inventory. Using techniques described herein, the customer may gesture, or mime, a description of the 3-D item (e.g., spatially describe the 3-D item) using his/her hands (or another object) in range of a sensing device (e.g., a depth camera), and an example system may generate a 3-D model based on the customer's gestures. If desired, the generated model may then be matched against predetermined 3-D models, for example, in an inventory database, to determine one or more predefined items that most closely match the generated 3-D model. For example, the system may then present the closest matches alongside their locations to the customer or store employee.

If a store employee or manager wishes to add another inventory object to the inventory database (e.g., for later selection), he/she may provide a pre-constructed 3-D model to the database, or may present a 3-D object to a sensing device (e.g., a depth camera), so that a 3-D model may be generated and added to the inventory database for later retrieval.

As another example, a person engaged in an electronically assisted gaming activity may wish to have particular gaming objects summoned into the gaming experience. He/she may spatially describe one of the gaming objects (e.g., by gesturing, or data miming, as discussed further below) so that an example system may generate a 3-D model based on the person's gestures. For example, the system may then search a database of predetermined 3-D models associated with predetermined gaming objects, to determine one or more predefined items that most closely match the generated 3-D model. For example, the game might tailor the object to dimensions indicated by the player's gestures.

If the person wishes to add another gaming object to the gaming object database (e.g., for later selection), the person may provide a pre-constructed 3-D model to the database, or may present a physical 3-D object to a sensing device (e.g., a depth camera), so that a 3-D model may be generated and added to the gaming object database for later retrieval.

As another example, a person engaging in virtual environment activities may wish to summon 3-D virtual objects for use in the virtual environment. Similarly to the previous example, he/she may gesture, or mime, a description of the desired 3-D object, and an example system may generate a 3-D model based on his/her gestures. The generated 3-D model may then be used for searching a database of predetermined virtual environment objects to determine one or more matches. For example, a child may wish to set up a virtual doll house by summoning a predetermined house structure and predetermined household objects such as furniture. For example, the child may spatially describe a table (e.g., via gesturing, or miming), and the system may search for matching predefined 3-D objects in a virtual environment database.

For example, a user may add a new virtual environment object to the virtual environment database by providing a pre-constructed 3-D model to the database, or by presenting a physical 3-D object to a sensing device (e.g., a depth camera), so that a 3-D model may be generated and added to the virtual environment database for later retrieval.

Figure 1B:
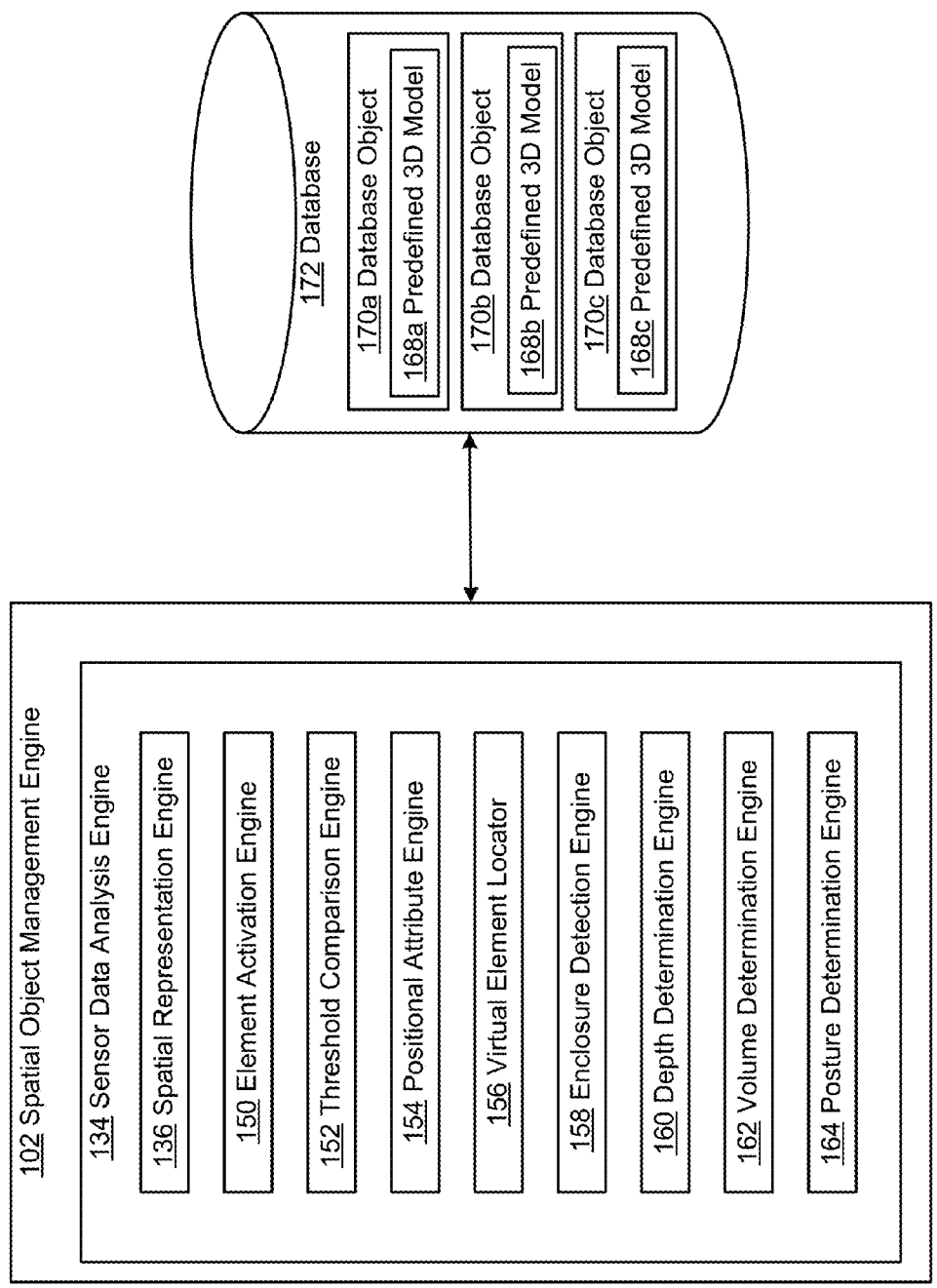
FIG. 1B is a block diagram of views of portions of the example system of FIG. 1A.

As further discussed herein, FIG. 1A is a block diagram of an example system 100 for spatial object management. FIG. 1B is a block diagram of more detailed views of portions of the example system of FIG. 1A.

As shown in FIGS. 1A-1B, a spatial object management engine 102 may include a sensor data receiving engine 104 that may be configured to receive sensor data 106. For example, the sensor data receiving engine 104 may receive sensor data 106 from one or more sensing devices. A memory 108 may be configured to store information including the sensor data 106. For example, the sensor data 106 may include image data 110 received from an image data input device 112, audio data 114 received from an audio data input device 116, and/or tactile data 118 received from a tactile data input device 120. For example, the image data input device 112 may include a three-dimensional (3-D) image data device that may be configured to obtain 3-D spatial image data. For example, the image data input device 112 may include a depth camera that may be configured to obtain image data 110 that includes depth values. As another example, the image data input device 112 may include one or more cameras configured to obtain image data 110 representing stereoscopic images that correspond to 3-D shapes. In this context, a "memory" may include a single memory device or multiple memory devices configured to store data and/or instructions. Further, the memory 108 may span multiple distributed storage devices.

A user interface engine 122 may be configured to manage communications between a user 124 and the spatial object management engine 102. For example, a store employee or system administrator (e.g., the user 124) may communicate with the spatial object management engine 102 via the user interface engine 122. A network communication engine 126 may be configured to manage network communication between the spatial object management engine 102 and other entities that may communicate with the spatial object management engine 102 via one or more networks.

For example, a display 128 may provide a visual, audio, and/or tactile medium for the user 124 (e.g., a store employee or system administrator) to monitor his/her input to and responses from the spatial object management engine 102. For example, the user 124 may provide input via a touchpad, a touchscreen, a keyboard or keypad, a mouse device, a trackball device, or an audio input device or other input sensing device. For example, the user 124 may speak information for voice recognition processing to character format.

According to an example embodiment, the sensor data receiving engine 104 may include an image data receiving engine 130 that may be configured to receive 3-D spatial image data associated with at least one arm motion of an actor 132 based on free-form movements of at least one hand of the actor, based on natural gesture motions. For example, the image data receiving engine 130 may receive the 3-D spatial image data from the image data input device 112, which may include a depth camera focused on a 3-D space that may be partially occupied by the actor 132.

In this context, "natural gestures" may include gestures made by an actor with substantially no prior instruction in how the gestures should be made, and with substantially no predetermined ordering of any particular gestures. Thus, "natural gestures" may include gestures determined solely by the actor in whatever timing or sequencing the actor chooses. Further, "natural gestures" may include elements such as height, width, and depth, as well as shapes and positioning of various components of an object (e.g., table top, legs, chair back, chair seat, chair legs).

The spatial object management engine 102 may include a sensor data analysis engine 134 that may include a spatial representation engine 136 (as shown in FIG. 1B) that may be configured to determine a plurality of sequential 3-D spatial representations 138 that each include 3-D spatial map data corresponding to a 3-D posture and position of the at least one hand at sequential instances of time during the free-form movements, based on the received 3-D spatial image data.

The spatial object management engine 102 may include an integrated model generator 140 that may be configured to generate, via a spatial object processor 142, an integrated 3-D model 144 based on incrementally integrating the 3-D spatial map data included in the determined sequential 3-D spatial representations 138 and comparing a threshold time value 146 with model time values indicating numbers of instances of time spent by the at least one hand occupying a plurality of 3-D spatial regions during the free-form movements. According to an example embodiment, the integrated model generator 140 may be configured to generate the integrated 3-D model 144 based on integrating temporally sequential 3-D representations of the 3-D positioning of the at least one hand in accordance with the received 3-D spatial image data 110.

In this context, a "processor" may include a single processor or multiple processors configured to process instructions associated with a processing system. A processor may thus include multiple processors processing instructions in parallel and/or in a distributed manner.

In this context, "integrating" may include substantially pure integration or aggregation of the positioning of the hands or other objects, in no particular sequencing or timing of the positioning, and with no particular predefined movements associated with particular elements of any predefined 3-D models. For example, there may be substantially no prior input or training of any particular meaning to be associated with integrating the positioning.

According to an example embodiment, the spatial object management engine 102 may include an initialization engine 148 configured to initialize a virtual 3-D map space based on discretized 3-D virtual map elements represented as volumized elements that each include weight values initialized to an initial value, wherein the virtual 3-D map space represents a 3-D space in close proximity to the actor 132. For example, the integrated model 144 may include the virtual 3-D map space.

According to an example embodiment, the integrated model generator 140 may include an element activation engine 150 (as shown in FIG. 1B) configured to proportionally increment the weight values of selected volumized elements associated with 3-D regions of the 3-D space, based on a determination indicating that a portion of the at least one hand has occupied the 3-D regions over a period of time during the free-form movements. According to an example embodiment, the integrated model generator 140 may include a threshold comparison engine 152 configured to compare a threshold value 146 with the weight values of each of the volumized elements.

According to an example embodiment, the integrated model generator 140 may include a positional attribute engine 154 configured to determine a depth, position, and orientation of the at least one hand, and a virtual element locator 156 configured to determine locations of volumized elements associated with the virtual 3-D map space that correspond to the depth, position, and orientation of the at least one hand. According to an example embodiment, the element activation engine 150 may be configured to activate a plurality of the volumized elements associated with an area of the virtual 3-D map space that represents a depth, location, and orientation corresponding to the depth, location, and orientation of the at least one hand, based on the locations determined by the virtual element locator 156.

According to an example embodiment, the volumized elements may include volumetric picture elements (voxels). According to an example embodiment, the initialization engine 148 may be configured to initialize the voxels to an inactive state, with initialized weight values. According to an example embodiment, the element activation engine 150 may be configured to activate groups of voxels based on the determination indicating that a portion of the at least one hand has occupied the 3-D regions over a period of time during the free-form movements, based on increasing the weight values associated with the groups of voxels with each activation of the groups of voxels. In this context, a "voxel" may represent a smallest distinguishable box-shaped portion of a 3-D image.

According to an example embodiment, the integrated model generator 140 may include an enclosure detection engine 158 configured to determine an enclosed space indicated by a posture of the at least one hand. For example, the enclosure detection engine 158 may determine an enclosed area within a clenched fist of the actor 132.

According to an example embodiment, the integrated model generator 140 may include a depth determination engine 160 configured to determine a depth of the enclosed space based on a determination of a depth of an area surrounding the enclosed space. According to an example embodiment, the element activation engine 150 may be configured to activate a plurality of the volumized elements associated with an area of the virtual 3-D space that represents a depth, location, and orientation corresponding to the enclosed space, in lieu of activation of a plurality of the volumized elements associated with an area of the virtual 3-D space that represents a depth, location, and orientation corresponding to the depth, location, and orientation of the at least one hand, during a period of time associated with the posture indicating the enclosed space. For example, the element activation engine 150 may activate a plurality of the volumized elements associated with an area of the virtual 3-D space that represents a depth, location, and orientation corresponding to an enclosed space associated with a clenched first of the actor 132, in lieu of the area corresponding to a volume occupied by the hand in the closed first orientation.

According to an example embodiment, the sensor data analysis engine 134 may include a volume determination engine 162 that may be configured to determine a volume associated with one of the hands of the actor based on the received 3-D spatial image data 110. According to an example embodiment, the spatial representation engine 136 may be configured to determine a 3-D representation of the one of the hands in a 3-D virtual map space based on the determined volume.

According to an example embodiment, the sensor data analysis engine 134 may include a posture determination engine 164 that may be configured to determine at least one hand posture based on the 3-D representation of the one of the hands.

According to an example embodiment, the enclosure detection engine 158 may be configured to determine whether the at least one hand posture of the at least one hand indicates a 3-D enclosed space. According to an example embodiment, the integrated model generator 140 may be configured to activate a plurality of volumized elements associated with portions of the integrated 3-D model that represent a depth, location, and orientation corresponding to the enclosed space, for sequential instances of time associated with the posture indicating the enclosed space, if it is determined that the enclosed 3-D space is indicated; and otherwise, to activate a plurality of the volumized elements associated with portions of the integrated 3-D model that represent a depth, location, and orientation corresponding to a depth, location, and orientation of the at least one hand. For example, the element activation engine 150 may be configured to activate the volumized elements corresponding to an area within a clenched fist, as discussed above.

According to an example embodiment, the posture determination engine 164 may be configured to determine that the at least one hand posture includes one or more of a flat hand posture, a curved hand posture, a hand clinched as a fist, or a hand postured with pinched fingers. For example, a single hand may be clenched as a fist, or two hands may be juxtaposed to form an enclosed space, as discussed further below.

According to an example embodiment, the enclosure detection engine 158 may be configured to determine an enclosed space indicated by at least one posture of the at least one hand, and the depth determination engine 160 may be configured to determine a depth of the enclosed space based on a determination of a depth of an area surrounding the enclosed space. According to an example embodiment, the spatial representation engine 136 may be configured to determine a plurality of sequential 3-D spatial representations that each include 3-D spatial map data corresponding to a depth, location, and orientation corresponding to the enclosed space, in lieu of 3-D spatial data corresponding to the posture and position of the at least one hand, during sequential instances of time associated with posturing of the at least one hand indicating the enclosed space.

According to an example embodiment, the spatial object management engine 102 may include a matching engine 166 that may be configured to determine, via the spatial object processor 142, a predefined 3-D model 168*a*, 168*b*, 168*c* associated with a database object 170*a*, 170*b*, 170*c* that matches the integrated 3-D model 144, wherein the natural gesture motions may emulate an appearance of a predetermined three-dimensional (3-D) item. For example, the database objects 170*a*, 170*b*, 170*c* may be stored in association with a database 172. For example, the predefined models 168*a*, 168*b*, 168*c* may represent physical 3-D objects.

According to an example embodiment, the volume determination engine 162 may be configured to determine a volume associated with one of the hands of the actor 132 based on tracking visible portions of the one of the hands over time, based on the received 3-D spatial image data 110. For example, a tracking engine 174 may be configured to temporally track the received image data 110. The tracking engine 174 may receive and store tracking data 175 in the memory 108. For example, the tracking data 175 may include timing data associated with instances of the received 3-D spatial image data.

According to an example embodiment, the positional attribute engine 154 may be configured to determine a yaw angle of the one of the hands based on a rotation of the tracked visible portions of the one of the hands in a top-down view, based on the received 3-D spatial image data.

According to an example embodiment, the positional attribute engine 154 may be configured to determine a roll angle and a pitch angle of the one of the hands based on variations in depth values associated with the tracked visible portions.

According to an example embodiment, the spatial object management engine 102 may include a database access engine 176 configured to initiate access to the database 172 including the plurality of database objects 170*a*, 170*b*, 170*c*, each database object 170*a*, 170*b*, 170*c* associated with a predefined 3-D model 168*a*, 168*b*, 168*c* that simulates an appearance of a predetermined 3-D item.

According to an example embodiment, the matching engine 166 may be configured to select, via the spatial object processor 142, at least one of the predetermined 3-D items, based on accessing the database access engine 176 and determining at least one of the database objects 170*a*, 170*b*, 170*c* that is associated with at least one of the predefined 3-D models 168*a*, 168*b*, 168*c* that matches the integrated 3-D model 144. For example, the matching engine 166 may select one or more of the predefined 3-D models 168*a*, 168*b*, 168*c* that most closely match the generated integrated model 144.

According to an example embodiment, the spatial object management engine 102 may include an update item input engine 178 configured to obtain an update 3-D model 180 that simulates an appearance of a predefined update 3-D item and initiate storage, in the database 172 via the database access engine 176, of an update database object associated with the update 3-D model 180.

According to an example embodiment, the predefined update 3-D item may include one or more of a 3-D inventory item, a 3-D gaming object, a 3-D real-world item, or a 3-D virtual reality environment object.

According to an example embodiment, the update item input engine 178 may be configured to obtain the update 3-D model 180 based on one or more of receiving image data 110 associated with a picture of the predefined update 3-D item, or receiving the update 3-D model 180 via an input device. For example, the user 124 may present a physical object to a sensing device (e.g., the image data input device 112) for generation of a model, of the user 124 may provide an already-generated model simulating an appearance of the physical object, for inclusion as a predefined 3-D model 168 in the database 172.

According to an example embodiment, the spatial object management engine 102 may include an audio data receiving engine 182 configured to receive audio data 114 associated with at least one verbal indicator representing an utterance. According to an example embodiment, the matching engine 166 may be configured to select, via the spatial object processor 142, at least one of the predetermined 3-D items, based on accessing the database access engine 176 and determining at least one of the database objects 170a, 170b, 170c that is associated with at least one of the predefined 3-D models 168a, 168b, 168c that matches the integrated 3-D model 144, based on the verbal indicator. For example, the actor 132 may utter "chair" so that the matching engine 166 may eliminate items not associated with a "chair" from consideration in the matching operations.

According to an example embodiment, the matching engine 166 may include a preliminary alignment engine 184 configured to generate a first alignment 186 of one of the predefined 3-D models 168a, 168b, 168c and the integrated 3-D model 144 based on matching at least one component that is included in the one of the predefined 3-D models 168a, 168b, 168c and the integrated 3-D model 144, based on scaling, translating, and rotating the one of the predefined 3-D models 168a, 168b, 168c and the integrated 3-D model 144. According to an example embodiment, the matching engine 166 may include an iterative alignment engine 188 configured to generate a second alignment 190 of the one of the predefined 3-D models 168a, 168b, 168c and the integrated 3-D model 144 based on an iterative closest point algorithm, based on the first alignment 186.

According to an example embodiment, the matching engine 166 may include a brute force alignment engine 192 configured to generate the second alignment 190 of the one of the predefined 3-D models 168a, 168b, 168c and the integrated 3-D model 144 based on a brute force alignment that includes a plurality of scales, rotations, and translations of the one of the predefined 3-D models 168a, 168b, 168c and the integrated 3-D model 144, based on the first alignment 186.

At least one selected model 194 may be selected from the predefined 3-D models 168a, 168b, 168c by the matching engine 166, based on the alignments 186, 190.

One skilled in the art of data processing may appreciate that there exist many techniques for determining matches of a 3-D models with 3-D models stored in a database. For example, a modeling-by-example technique may provide partial matching of 3-D objects based on single parts of the compared objects.

The spatial object management engine 102 may include a tactile data receiving engine 196 that may be configured to receive tactile data 118 from the tactile data input device 120. For example, sensors may be attached to the actor 132, and movements of the actor 132 may be sensed as 3-D spatial sensor data. For example, if sensors are attached to the actor's hands, then 3-D positioning of the hands may be sensed by the tactile input device 120, received by the tactile data receiving engine 196, and processed by the integrated model generator 140 similarly to the 3-D spatial image data as discussed above.

Figure 2A:
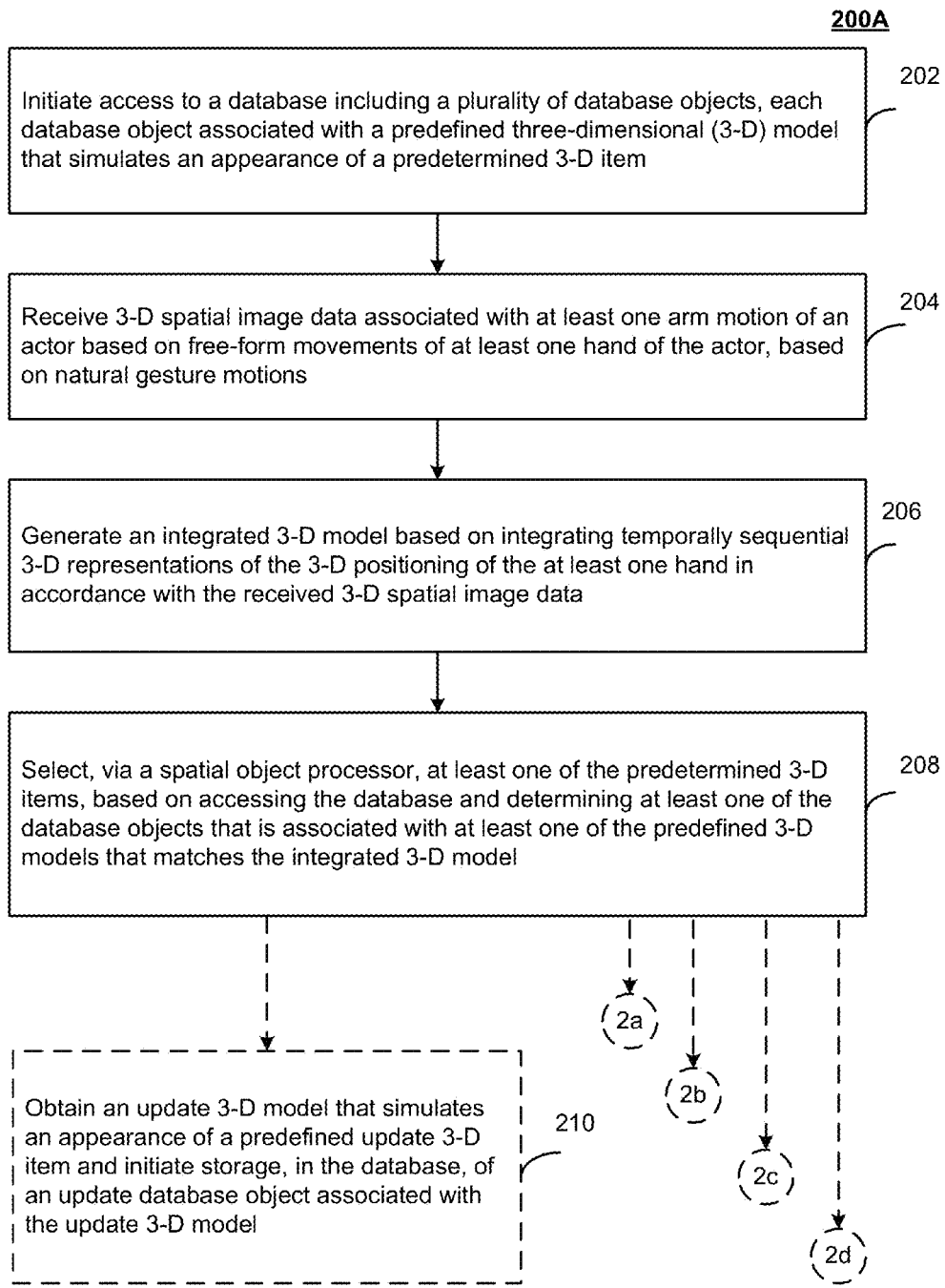
Figure 2C:
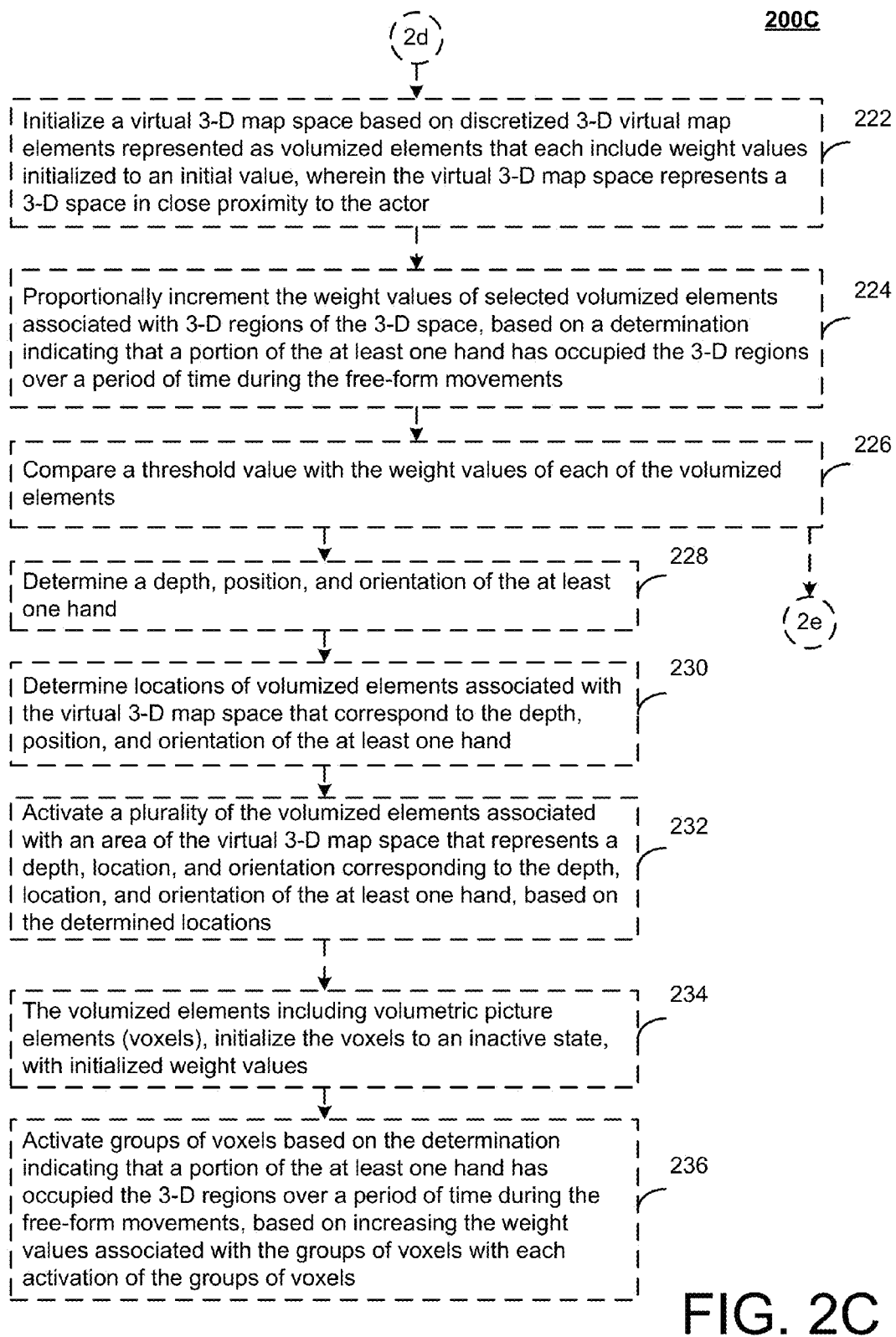
Figure 2D:
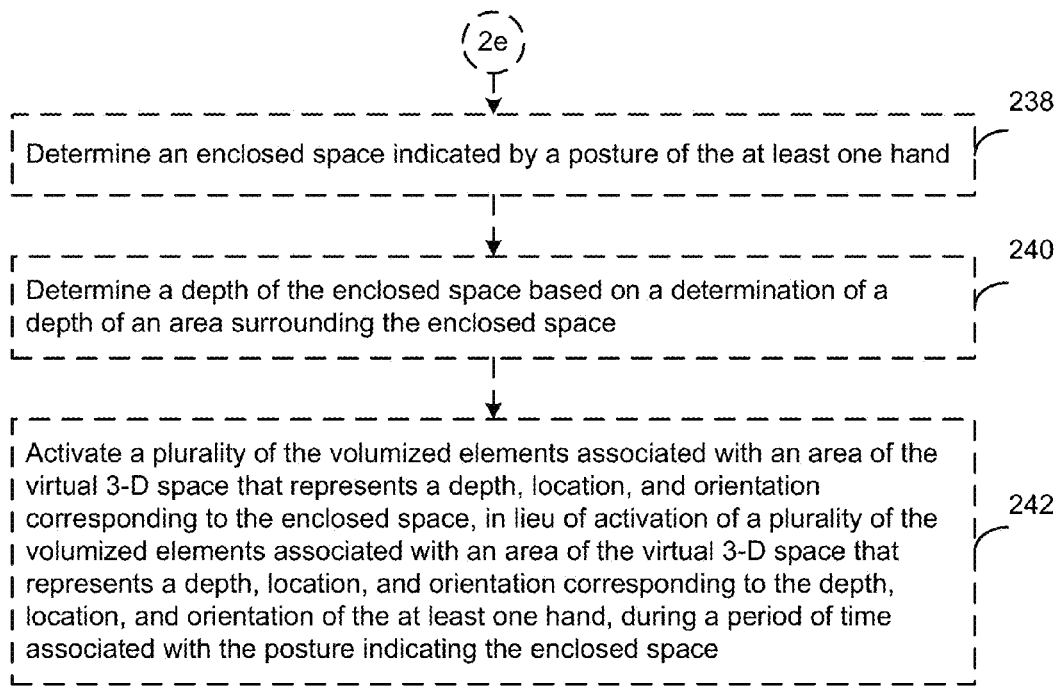

FIGS. 2A-2D are a flowchart 200 illustrating example operations of the system of FIGS. 1A-1B, according to an example embodiment. In the example of FIG. 2A, access to a database including a plurality of database objects, each database object associated with a predefined three-dimensional (3-D) model that simulates an appearance of a predetermined 3-D item may be initiated (202). For example, the database access engine 176 may initiate access to the database 172 including the plurality of database objects 170a, 170b, 170c, each database object 170a, 170b, 170c associated with a predefined 3-D model 168a, 168b, 168c that simulates an appearance of a predetermined 3-D item, as discussed above.

Three-dimensional spatial image data associated with at least one arm motion of an actor based on free-form movements of at least one hand of the actor, based on natural gesture motions, may be received (204). For example, the image data receiving engine 130 may receive the 3-D spatial image data associated with at least one arm motion of the actor 132 based on free-form movements of the at least one hand of the actor 132, based on natural gesture motions, as discussed above.

An integrated 3-D model may be generated based on integrating temporally sequential 3-D representations of the 3-D positioning of the at least one hand in accordance with the received 3-D spatial image data (206). For example, the integrated model generator 140 may generate the integrated 3-D model 144 based on integrating temporally sequential 3-D representations 138 of the 3-D positioning of the at least one hand in accordance with the received 3-D spatial image data 110, as discussed above.

At least one of the predetermined 3-D items may be selected, based on accessing the database and determining at least one of the database objects that is associated with at least one of the predefined 3-D models that matches the integrated 3-D model (208). For example, the matching engine 166 may select at least one of the predetermined 3-D items, based on accessing the database access engine 176 and determining at least one of the database objects 170a, 170b, 170c that is associated with at least one of the predefined 3-D models 168a, 168b, 168c that matches the integrated 3-D model 144, as discussed above.

According to an example embodiment, an update 3-D model that simulates an appearance of a predefined update 3-D item may be obtained, and storage, in the database, of an update database object associated with the update 3-D model may be initiated (210). For example, the update item input engine 178 may obtain the update 3-D model 180 that simulates an appearance of a predefined update 3-D item and initiate storage, in the database 172 via the database access engine 176, of an update database object associated with the update 3-D model 180, as discussed above.

According to an example embodiment, the predefined update 3-D item may include one or more of a 3-D inventory item, a 3-D gaming object, a 3-D real-world item, or a 3-D virtual reality environment object. According to an example embodiment, the update 3-D model may be obtained based on one or more of receiving image data associated with a picture of the predefined update 3-D item, or receiving the update 3-D model via an input device. For example, the update item input engine 178 may obtain the update 3-D model 180 based on one or more of receiving image data 110 associated with a picture of the predefined update 3-D item, or receiving the update 3-D model 180 via an input device, as discussed above.

According to an example embodiment, audio data associated with at least one verbal indicator representing an utterance may be received, and selecting, via the spatial object processor, at least one of the predetermined 3-D items, may be based on determining at least one of the database objects that is associated with at least one of the predefined 3-D models that matches the integrated 3-D model, based on the verbal indicator (212). For example, the audio data receiving engine 182 may be configured to receive audio data 114 associated with at least one verbal indicator representing an utterance. According to an example embodiment, the matching engine 166 may select at least one of the predetermined 3-D items, based on accessing the database access engine 176 and determining at least one of the database objects 170a, 170b, 170c that is associated with at least one of the predefined 3-D models 168a, 168b, 168c that matches the integrated 3-D model 144, based on the verbal indicator, as discussed above.

According to an example embodiment, a first alignment of one of the predefined 3-D models and the integrated 3-D model may be generated based on matching at least one component that is included in the one of the predefined 3-D models and the integrated 3-D model, based on scaling, translating, and rotating the one of the predefined 3-D models and the integrated 3-D model (214). For example, the preliminary alignment engine 184 may generate the first alignment 186 of one of the predefined 3-D models 168a, 168b, 168c and the integrated 3-D model 144 based on matching at least one component that is included in the one of the predefined 3-D models 168a, 168b, 168c and the integrated 3-D model 144, based on scaling, translating, and rotating the one of the predefined 3-D models 168a, 168b, 168c and the integrated 3-D model 144, as discussed further herein.

According to an example embodiment, a second alignment of the one of the predefined 3-D models and the integrated 3-D model may be generated based on an iterative closest point algorithm, based on the first alignment (216). For example, the iterative alignment engine 188 may generate the second alignment 190 of the one of the predefined 3-D models 168a, 168b, 168c and the integrated 3-D model 144 based on an iterative closest point algorithm, based on the first alignment 186, as discussed further herein.

According to an example embodiment, a first alignment of the one of the predefined 3-D models and the integrated 3-D model may be generated based on matching at least one component that is included in the one of the predefined 3-D models and the integrated 3-D model, based on scaling, translating, and rotating the one of the predefined 3-D models and the integrated 3-D model (218). According to an example embodiment, a second alignment of the one of the predefined 3-D models and the integrated 3-D model may be generated based on a brute force alignment that includes a plurality of scales, rotations, and translations of the one of the predefined 3-D models and the integrated 3-D model, based on the first alignment (220). For example, the brute force alignment engine 192 may generate the second alignment 190 of the one of the predefined 3-D models 168a, 168b, 168c and the integrated 3-D model 144 based on a brute force alignment that includes a plurality of scales, rotations, and translations of the one of the predefined 3-D models 168a, 168b, 168c and the integrated 3-D model 144, based on the first alignment 186, as discussed further herein.

According to an example embodiment, a virtual 3-D map space may be initialized based on discretized 3-D virtual map elements represented as volumized elements that each include weight values initialized to an initial value, wherein the virtual 3-D map space represents a 3-D space in close proximity to the actor (222). For example, the initialization engine 148 may initialize a virtual 3-D map space based on discretized 3-D virtual map elements represented as volumized elements that each include weight values initialized to an initial value, wherein the virtual 3-D map space represents a 3-D space in close proximity to the actor 132, as discussed above.

According to an example embodiment, integrating the temporally sequential 3-D representations may include proportionally incrementing the weight values of selected volumized elements associated with 3-D regions of the 3-D space, based on a determination indicating that a portion of the at least one hand has occupied the 3-D regions over a period of time during the free-form movements (224), and comparing a threshold value with the weight values of each of the volumized elements (226). For example, the element activation engine 150 may proportionally increment the weight values of selected volumized elements associated with 3-D regions of the 3-D space, based on a determination indicating that a portion of the at least one hand has occupied the 3-D regions over a period of time during the free-form movements, as discussed above. For example, the threshold comparison engine 152 may compare the threshold value 146 with the weight values of each of the volumized elements, as discussed further herein.

According to an example embodiment, a depth, position, and orientation of the at least one hand may be determined (228), and locations of volumized elements associated with the virtual 3-D map space that correspond to the depth, position, and orientation of the at least one hand may be determined (230). For example, the positional attribute engine 154 may determine a depth, position, and orientation of the at least one hand, and the virtual element locator 156 may determine locations of volumized elements associated with the virtual 3-D map space that correspond to the depth, position, and orientation of the at least one hand, as discussed above.

According to an example embodiment, integrating the temporally sequential 3-D representations may include activating a plurality of the volumized elements associated with an area of the virtual 3-D map space that represents a depth, location, and orientation corresponding to the depth, location, and orientation of the at least one hand, based on the determined locations (232). For example, the element activation engine 150 may activate a plurality of the volumized elements associated with an area of the virtual 3-D map space that represents a depth, location, and orientation corresponding to the depth, location, and orientation of the at least one hand, based on the locations determined by the virtual element locator 156, as discussed above.

According to an example embodiment, the volumized elements may include volumetric picture elements (voxels), which may be initialized to an inactive state, with initialized weight values (234). For example, the initialization engine 148 may initialize the voxels to an inactive state, with initialized weight values, as discussed above.

According to an example embodiment, activating the plurality of the volumized elements may include activating groups of voxels based on the determination indicating that a portion of the at least one hand has occupied the 3-D regions over a period of time during the free-form movements, based on increasing the weight values associated with the groups of voxels with each activation of the groups of voxels (236). For example, the element activation engine 150 may activate groups of voxels based on the determination indicating that a portion of the at least one hand has occupied the 3-D regions over a period of time during the free-form movements, based on increasing the weight values associated with the groups of voxels with each activation of the groups of voxels, as discussed above.

According to an example embodiment, an enclosed space indicated by a posture of the at least one hand may be determined (238). For example, the enclosure detection engine 158 may determine an enclosed space indicated by a posture of the at least one hand, as discussed above. According to an example embodiment, a depth of the enclosed space may be determined based on a determination of a depth of an area surrounding the enclosed space (240). For example, the depth determination engine 160 may determine the depth of the enclosed space based on a determination of a depth of an area surrounding the enclosed space, as discussed above.

According to an example embodiment, a plurality of the volumized elements associated with an area of the virtual 3-D space that represents a depth, location, and orientation corresponding to the enclosed space may be activated, in lieu of activation of a plurality of the volumized elements associated with an area of the virtual 3-D space that represents a depth, location, and orientation corresponding to the depth, location, and orientation of the at least one hand, during a period of time associated with the posture indicating the enclosed space (242). For example, the element activation engine 150 may activate the plurality of the volumized elements associated with an area of the virtual 3-D space that represents a depth, location, and orientation corresponding to the enclosed space, in lieu of activation of the plurality of the volumized elements associated with an area of the virtual 3-D space that represents a depth, location, and orientation corresponding to the depth, location, and orientation of the at least one hand, during a period of time associated with the posture indicating the enclosed space, as discussed above.

Figure 3A:
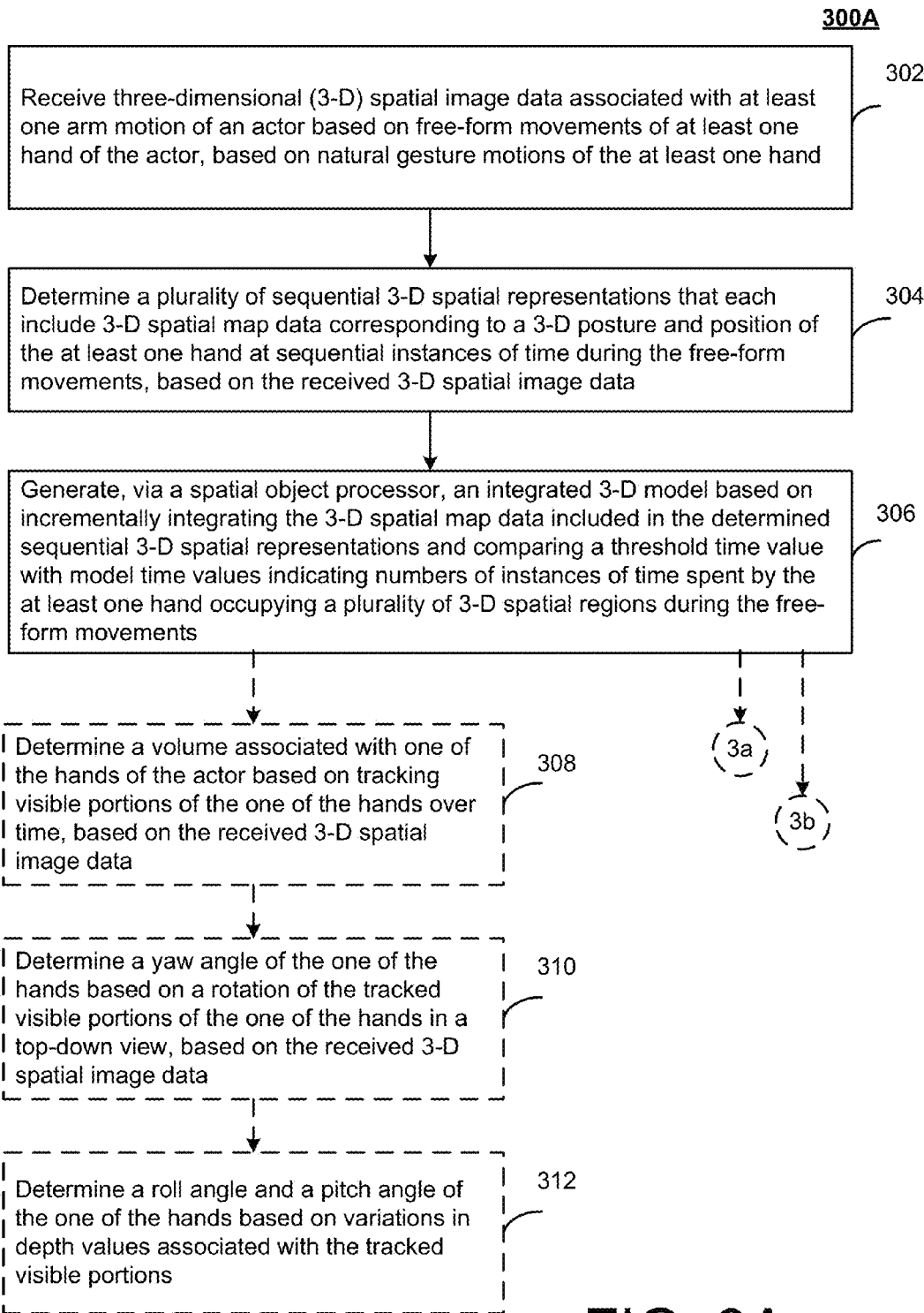
FIGS. 3A-3C are a flowchart illustrating example operations of the system of FIGS. 1A-1B.
Figure 3B:
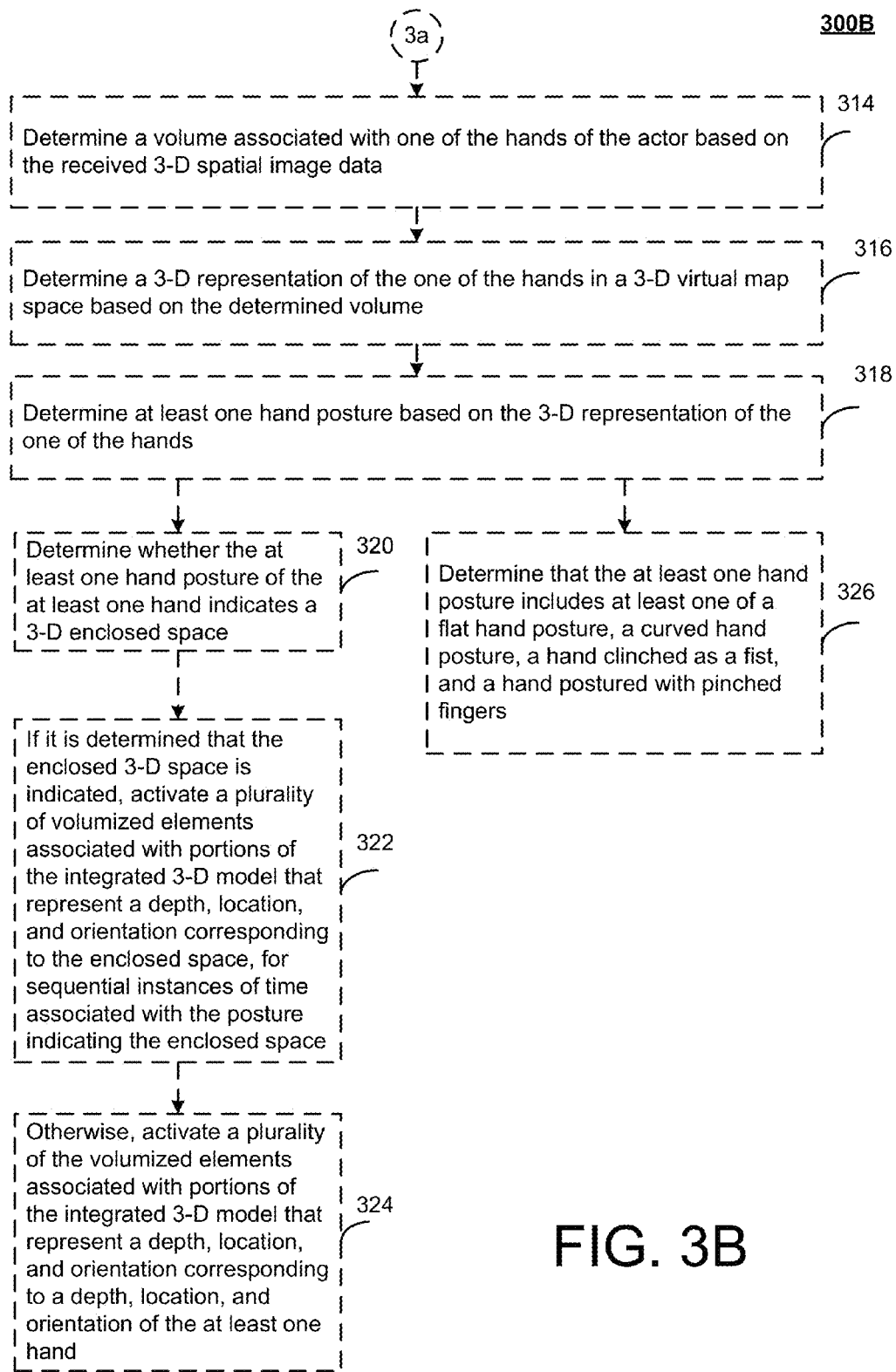
Figure 3C:
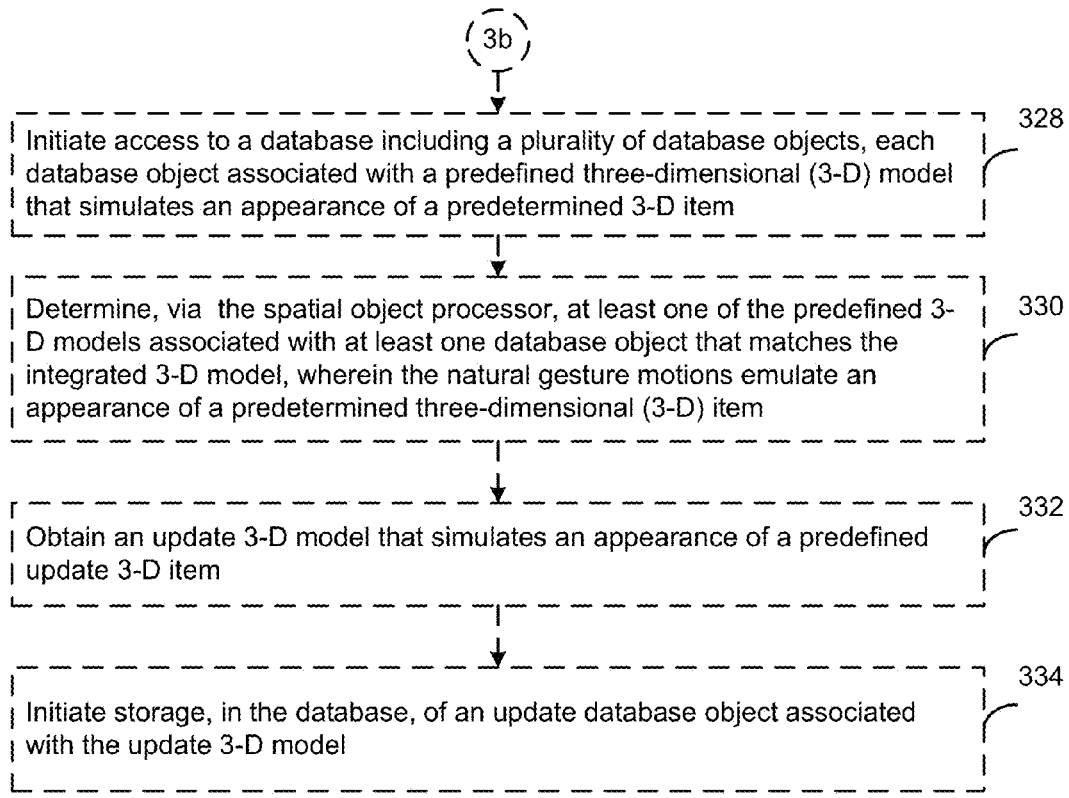

FIG. 3A-3C is a flowchart 300 illustrating example operations of the system of FIGS. 1A-1B, according to an example embodiment. In the example of FIG. 3, three-dimensional (3-D) spatial image data associated with at least one arm motion of an actor based on free-form movements of at least one hand of the actor, based on natural gesture motions of the at least one hand, may be received (302). For example, the sensor data receiving engine 104 may include an image data receiving engine 130 that may be configured to receive 3-D spatial image data associated with at least one arm motion of the actor 132 based on free-form movements of at least one hand of the actor, based on natural gesture motions, as discussed above.

A plurality of sequential 3-D spatial representations that each include 3-D spatial map data corresponding to a 3-D posture and position of the at least one hand at sequential instances of time during the free-form movements may be determined, based on the received 3-D spatial image data (304). For example, the spatial representation engine 136 that may determine the plurality of sequential 3-D spatial representations 138 that each include 3-D spatial map data corresponding to a 3-D posture and position of the at least one hand at sequential instances of time during the free-form movements, based on the received 3-D spatial image data, as discussed above.

An integrated 3-D model may be generated, via the spatial object processor, based on incrementally integrating the 3-D spatial map data included in the determined sequential 3-D spatial representations and comparing a threshold time value with model time values indicating numbers of instances of time spent by the at least one hand occupying a plurality of 3-D spatial regions during the free-form movements (306). For example, the integrated model generator 140 may generate, via the spatial object processor 142, the integrated 3-D model 144 based on incrementally integrating the 3-D spatial map data included in the determined sequential 3-D spatial representations 138 and comparing the threshold time value 146 with model time values indicating numbers of instances of time spent by the at least one hand occupying a plurality of 3-D spatial regions during the free-form movements, as discussed above.

According to an example embodiment, a volume associated with one of the hands of the actor may be determined based on tracking visible portions of the one of the hands over time, based on the received 3-D spatial image data (308). For example, the volume determination engine 162 may determine the volume associated with the one of the hands of the actor 132 based on tracking visible portions of the one of the hands over time, based on the received 3-D spatial image data 110, as discussed above.

According to an example embodiment, a yaw angle of the one of the hands may be determined based on a rotation of the tracked visible portions of the one of the hands in a top-down view, based on the received 3-D spatial image data (310). For example, the positional attribute engine 154 may determine a yaw angle of the one of the hands based on a rotation of the tracked visible portions of the one of the hands in a top-down view, based on the received 3-D spatial image data, as discussed above.

According to an example embodiment, a roll angle and a pitch angle of the one of the hands may be determined based on variations in depth values associated with the tracked visible portions (312). For example, the positional attribute engine 154 may determine a roll angle and a pitch angle of the one of the hands based on variations in depth values associated with the tracked visible portions, as discussed above.

According to an example embodiment, a volume associated with one of the hands of the actor may be determined based on the received 3-D spatial image data (314). For example, the volume determination engine 162 may determine a volume associated with one of the hands of the actor 132 based on the received 3-D spatial image data 110, as discussed above.

A 3-D representation of the one of the hands in a 3-D virtual map space may be determined based on the determined volume (316), and at least one hand posture may be determined based on the 3-D representation of the one of the hands (318). For example, the spatial representation engine 136 may determine the 3-D representation of the one of the hands in the 3-D virtual map space based on the determined volume, as discussed above. For example, the posture determination engine 164 may determine at least one hand posture based on the 3-D representation of the one of the hands, as discussed above.

According to an example embodiment, it may be determined whether at least one hand posture of the at least one hand indicates a 3-D enclosed space (320). If it is determined that the enclosed 3-D space is indicated, generating the integrated 3-D model may include activating a plurality of volumized elements associated with portions of the integrated 3-D model that represent a depth, location, and orientation corresponding to the enclosed space, for sequential instances of time associated with the posture indicating the enclosed space (322). Otherwise, generating the integrated 3-D model may include activating a plurality of the volumized elements associated with portions of the integrated 3-D model that represent a depth, location, and orientation corresponding to a depth, location, and orientation of the at least one hand (324). For example, the integrated model generator 140 may activate the plurality of volumized elements associated with portions of the integrated 3-D model that represent a depth, location, and orientation corresponding to the enclosed space, or may activate a plurality of the volumized elements associated with portions of the integrated 3-D model that represent a depth, location, and orientation corresponding to a depth, location, and orientation of the at least one hand, as discussed above.

According to an example embodiment, it may be determined that the at least one hand posture includes one or more of a flat hand posture, a curved hand posture, a hand clinched as a fist, or a hand postured with pinched fingers (326). For example, the posture determination engine 164 may determine that the at least one hand posture includes one or more of a flat hand posture, a curved hand posture, a hand clinched as a fist, or a hand postured with pinched fingers, as discussed further herein.

According to an example embodiment, access to a database including a plurality of database objects, each database object associated with a predefined three-dimensional (3-D) model that simulates an appearance of a predetermined 3-D item may be initiated (328). For example, the database access engine 176 may initiate access to the database 172 including the plurality of database objects 170a, 170b, 170c, each database object 170a, 170b, 170c associated with a predefined 3-D model 168a, 168b, 168c that simulates an appearance of a predetermined 3-D item, as discussed above.

At least one of the predefined 3-D models associated with at least one database object that matches the integrated 3-D model may be determined, via the spatial object processor, wherein the natural gesture motions emulate an appearance of a predetermined three-dimensional (3-D) item (330). For example, the matching engine 166 may determine, via the spatial object processor 142, the predefined 3-D model 168a, 168b, 168c associated with the database object 170a, 170b, 170c that matches the integrated 3-D model 144, wherein the natural gesture motions may emulate an appearance of a predetermined three-dimensional (3-D) item, as discussed above.

According to an example embodiment, an update 3-D model that simulates an appearance of a predefined update 3-D item may be obtained (332), and storage, in the database, of an update database object associated with the update 3-D model, may be initiated (334). For example, the update item input engine 178 may obtain the update 3-D model 180 that simulates an appearance of a predefined update 3-D item and initiate storage, in the database 172 via the database access engine 176, of the update database object associated with the update 3-D model 180, as discussed above.

Figure 4:
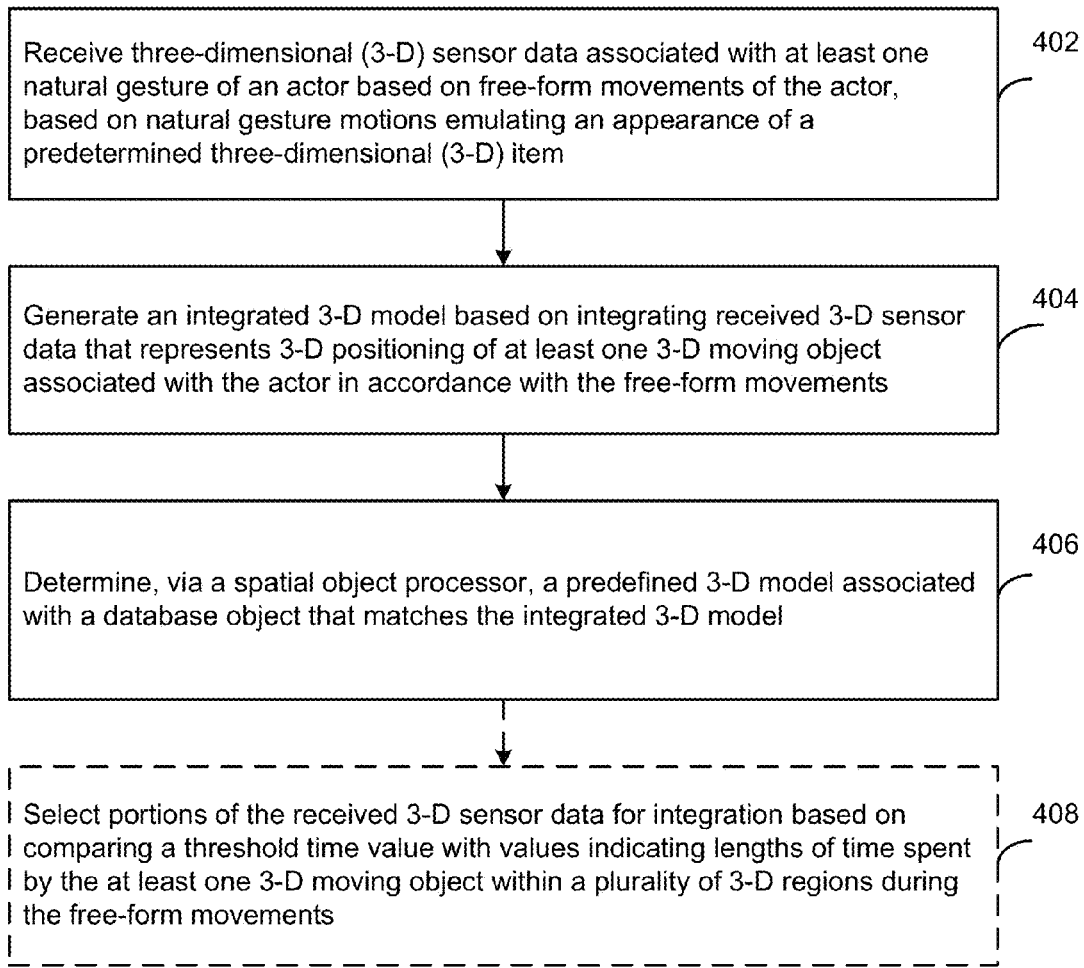
FIG. 4 is a flowchart illustrating example operations of the system of FIGS. 1A-1B.

FIG. 4 is a flowchart 400 illustrating example operations of the system of FIGS. 1A-1B, according to an example embodiment. In the example of FIG. 4, three-dimensional (3-D) sensor data associated with at least one natural gesture of an actor based on free-form movements of the actor, based on natural gesture motions emulating an appearance of a predetermined three-dimensional (3-D) item, may be received (402). For example, the sensor data receiving engine 104, discussed above, may be configured to receive 3-D sensor data 106 associated with at least one natural gesture of an actor based on free-form movements of the actor, based on natural gesture motions emulating an appearance of a predetermined three-dimensional (3-D) item. For example, the sensor data 106 may include one or more of image data 110, audio data 114, or tactile data 118, as discussed above.

An integrated 3-D model may be generated based on integrating received 3-D sensor data that represents 3-D positioning of at least one 3-D moving object associated with the actor in accordance with the free-form movements (404). For example, the integrated model generator 140, discussed above, may be configured to generate, via the spatial object processor 142, the integrated 3-D model 144 based on integrating received 3-D sensor data 106 that represents 3-D positioning of at least one 3-D moving object associated with the actor in accordance with the free-form movements.

For example, the actor may grasp a 3-D object (e.g., a book, laptop, mobile phone) and move the 3-D object in natural gesturing motions to describe a shape of a desired 3-D item. As another example, the actor may don or attach sensing devices (e.g., gloves, gaming gear) and gesture a description of the shape of the desired 3-D item via the sensing devices. For example, the actor may move to assume a perceived shape of a 3-D item.

A predefined 3-D model associated with a database object that matches the integrated 3-D model may be determined, via a spatial object processor (406). For example, the matching engine 166 may determine, via the spatial object processor 142, a predefined 3-D model 168a, 168b, 168c associated with a database object 170a, 170b, 170c that matches the integrated 3-D model 144, as discussed above.

According to an example embodiment, portions of the received 3-D sensor data may be selected for integration based on comparing a threshold time value with values indicating lengths of time spent by the at least one 3-D moving object within a plurality of 3-D regions during the free-form movements (408). For example, the integrated model generator 140, discussed above, may be configured to select portions of the received 3-D sensor data 106 for integration based on comparing the threshold time value 146 with values indicating lengths of time spent by the at least one 3-D moving object within a plurality of 3-D regions during the free-form movements, as discussed further below.

FIGS. 5A-5E illustrate example gesture movements and example models associated with the gesture movements, according to an example embodiment. As shown in FIG. 5A, an actor 502 may mentally envision a 3-D object 504. For example, the 3-D object may include a three-legged stool that includes a seat 506 and angled legs 508. The actor 502 may indicate dimensions of the 3-D object 504, for example, by flattening and moving his/her hands to positions 510 indicating a distance separating the hands, to indicate a height, width, and/or depth associated with the 3-D object 504. As shown in FIG. 5A, the actor 502 may spatially describe, or use natural gestures to mime, the description of the 3-D object 504 in range of a sensing device 512 (e.g., an overhead depth camera).

As shown in FIG. 5B, the actor 502 may flatten and move his/her hands in a rotating motion 514 to visualize the actor's mental image of the seat 506 of the stool (e.g., the 3-D object 504). As shown in FIG. 5C, the actor 502 may form fists and move his/her hands in angled vertical motions 516 to visualize the actor's mental image of the angled legs 508 of the stool (e.g., the 3-D object 504).

According to an example embodiment, the example system 100 of FIG. 1 may receive image data obtained by the sensing device 512 in tracking the actor's movements. The system 100 may then generate a 3-D model 518 as shown in FIG. 5D, at least based on image data resulting from the tracking of the positions 510, the rotating motion 514, and the angled vertical motions 516 of the hands of the actor 502.

According to an example embodiment, the system 100 may determine a predetermined 3-D object that most closely matches the generated 3-D model 518, as discussed above.

For example, the generated 3-D model 518 may be matched with a predetermined 3-D model associated with a three legged stool, as shown by a 3-D model 522 overlay with the generated 3-D model 520 as shown in FIG. 5E.

According to an example embodiment, a "data miming" technique may be based on observing and making sense of human gesture, exploiting the human sense of spatial references, and using the richness of hand shape and motion when describing objects to infer described objects, as shown in FIGS. 5A-5E. Similar to using gestures when talking to a human observer, data miming or gesturing may observe passively, thereby providing little to no feedback during the gesture. An example actor may thus work solely from a mental image (e.g., 3-D object 504) of the described object and his/her gestures may be used to implicitly create a virtual representation (e.g., the 3-D model 518) of the mental image.

The virtual representation may be used to classify the described object (e.g., "stool"), as well as to extract the object's specifics in order to distinguish it from other instances in that class. For example, an actor 132 may describe a chair, and may further describe a particular and existing chair that has three legs, slanted from the center, that is two feet tall (e.g., the described stool as discussed above with regard to FIGS. 5A-5E). Without the more specific details, the reference to the particular chair may be unclear.

Data miming or gesturing may thus passively observe how the actor 132 acts and may not provide any feedback as the actor 132 is gesturing. Thus, the actor 132 may work solely from his/her conceptual model of a 3-D object to determine his/her gesturing movements. As it may provide little to no feedback during gesturing, data miming or gesturing may assume that actors 132 maintain a frame of reference when performing gestures. According to an example embodiment, the actor's body may become a spatial reference. For example, actors 132 may not rely on visual feedback when using both hands together. For example, humans may further have an ability to know where both hands are relative in space and may maintain a spatial anchor outside their body over a brief amount of time (e.g., a short-term visual memory for maintaining spatial relationships).

Speakers have used gesture in conversation throughout history. For example, speakers may use beat gestures, which are used for emphasis, deictic gestures for indicating objects (pointing), metaphoric gestures to convey abstract meaning, and iconic gestures. Iconic gestures may depict a concrete object or event, bear a close formal relationship to the content of the speech, and may be used in attempts to describe the shape or form of an object. As other examples, emblems may include signs that convey meaning only by convention (e.g., an "OK" sign).

Pantomime gestures may be similar to iconic gestures in that they may depict objects or actions, but may not involve speech (and may be distinguished from gestures used in theatrical miming). Further, sign languages may be used a replacements of spoken languages and may thus complement speech the least.

According to an example embodiment, data miming or gesturing may be used in performing matching against stored predetermined 3-D models of objects. Since these models may not be based on convention, but rather on the actual shape of real-world physical objects, it may be understood that data miming gestures may include iconic or pantomime gestures, and typically not emblems. For example, in specifying a class by speech (e.g., "chair"), gesture and speech may be used in complementary techniques, as the dependence of one on the other does not involve the complexity that maybe typical of natural iconic gestures. According to an example embodiment, some of the example gestures discussed herein may be referred to as "pantomime" or "mime" gestures.

In an example study, humans have been observed to determine potential gesturing techniques for describing objects. For example, the actors 132 may look at an object, and then gesture a description of the object from memory. For example, the actors 132 may describe the object using only their hands; they may not use speech or body postures to augment their descriptions of the object. For example, the actors 132 may not receive any feedback during their object descriptions. For example, the actors 132 may complete a description of an object by lowering their arms. For example, the actors 132 may receive no instruction as to which gestures to use for object description. For example, the actors 132 may be asked to spatially describe primitive objects such as box shapes, cone shapes and pyramid shapes, as well as more complex shapes. For example, a result of such a study may involve determining features the actors 132 may include when spatially describing complex objects.

Figure 6:
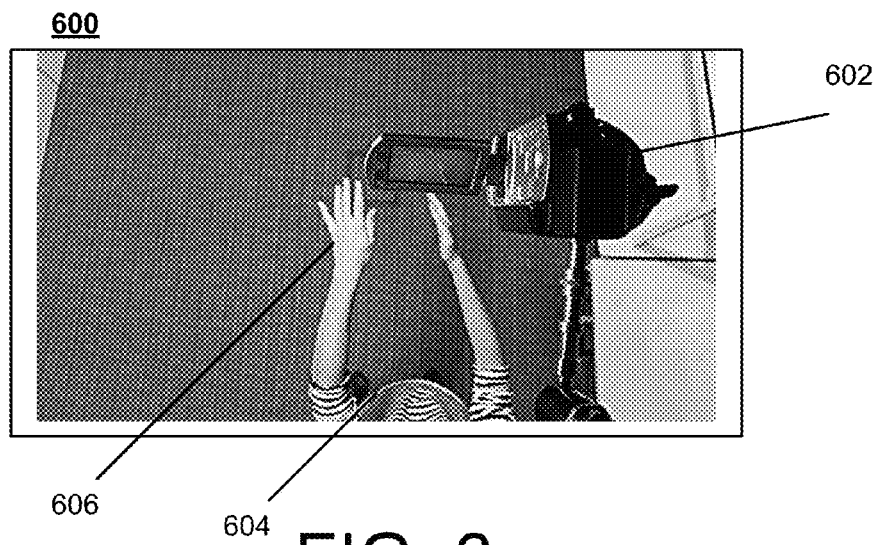
FIG. 6 illustrates an example actor gesturing in close proximity to a video camera.

FIG. 6 illustrates an example actor gesturing in close proximity to a video camera. As shown in an example scenario of FIG. 6, an overhead video camera 602 may be mounted to a ceiling 8 feet from the ground. Thus, the example video camera 602 may capture a top-down volume of 5 feetW, 3 feetH, and 5 feetD. As shown in FIG. 6, an actor 604 (e.g., the actor 132) may spatially describe objects in range of the video camera 602 (e.g., the image data input device 112). As shown in FIG. 6, the actor 604 may provide gestures via hands 606 of the actor, as discussed above.

Figure 7:
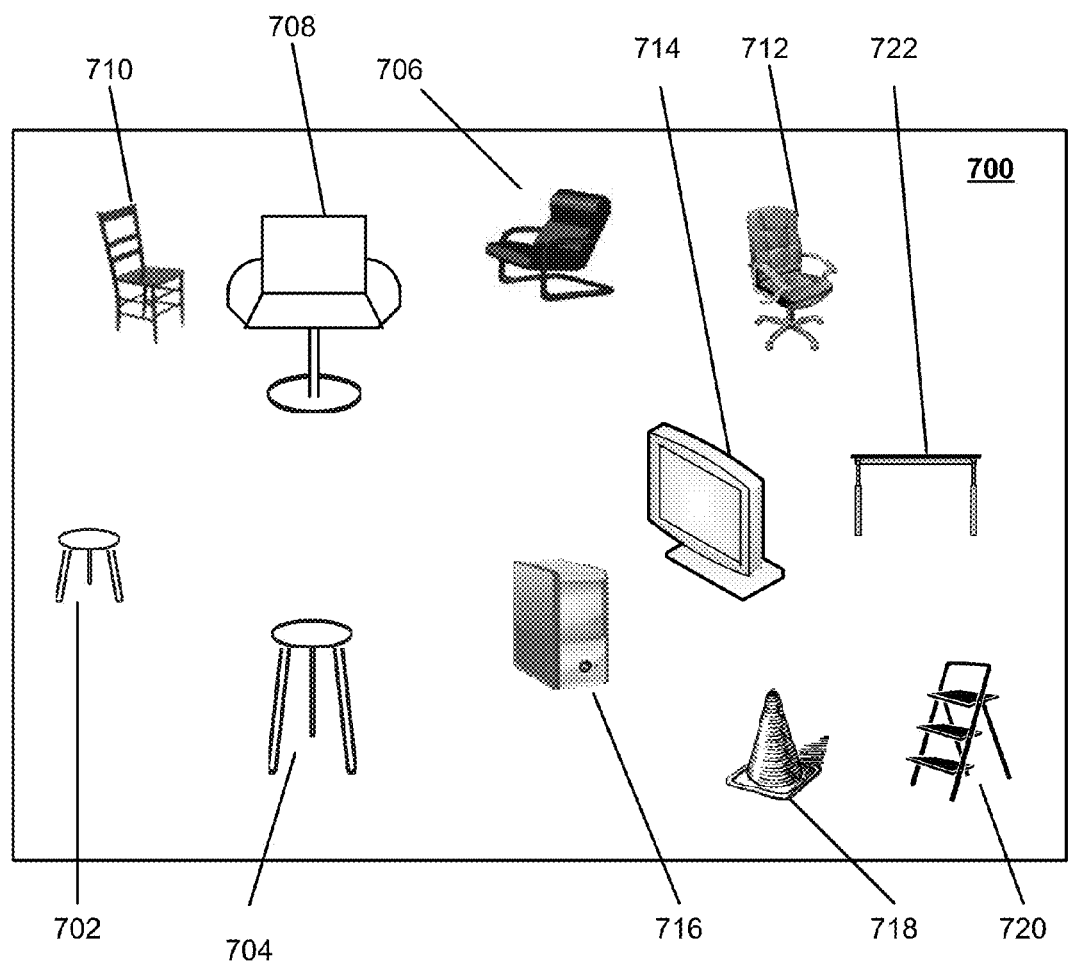
FIG. 7 illustrates example three-dimensional (3-D) items.

FIG. 7 illustrates example three-dimensional (3-D) items. For example, the 3-D items may include a short three-legged stool 702, and a taller three-legged stool 704. The 3-D items may further include an S-shaped chair 706, a one-legged chair 708, and a four-legged chair 710. The 3-D items may further include an office chair on wheels 712, a monitor 714, a personal computer (PC) 716, a cone 718, a ladder 720, and a table 722. Such 3-D items may be spatially described by human actors (e.g., the actor 132).

Figures 8A, 8B, 8C:
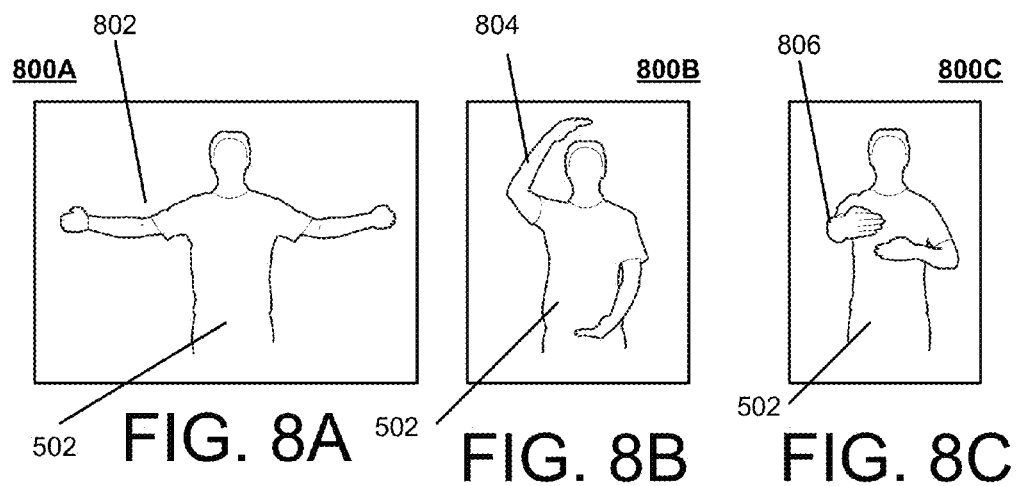
FIGS. 8A-8C illustrate example gestures of an example actor.

FIGS. 8A-8C illustrate example gestures of an example actor. According to example studied observations of a group of humans, actors 502 involved in gestures or miming may naturally maintain relative proportions of an object's parts, as well as maintaining relative scale across objects. For example, actors 502 may naturally use a large fraction of their arm's length to describe large tables, while describing chairs smaller as appropriate. For example, actors 502 may naturally scale objects non-uniformly to adapt sizes relative to an area covered by arm's length in each direction. Thus, by nature of the human body, objects may be described as wider 802 than tall 804, and taller than deep 806.

For example, actors 502 may naturally use a top-down approach to describe objects; after larger, more apparent surfaces they may describe smaller parts of the objects. For example, actors 502 may distinguish between surfaces (e.g., flat faces of the PC 716, the monitor 714, the table 722, as well as curved surfaces, such as a frame of the ladder 720, seats and backrests of chairs) and smaller components, such as struts and connections.

For example, actors 502 may naturally use both hands in a parallel pose, facing one another to define symmetric elements of an object (e.g., the PC 716, the monitor 714). Those symmetric parts may not represent the dimensions of the entire object, but may specify certain parts. For example, actors 502 may naturally use simultaneous and symmetric hand movement to describe smaller parts such as legs of the chair 710, or a frame of the ladder 720.

For example, when the shape of an object resembles that of a box, actors 502 may define the dimensions of parts of the object (e.g., PC 716, monitor 714). For example, actors 502 may naturally simultaneously move both hands in a flat pose back and forth along the bounding dimensions of the object repeatedly. For example, actors 502 may naturally hold both hands flat in place to define those boundaries. For example, actors 502 may naturally draw wireframes of objects in box shape (e.g., the PC 716).

Figure 9:
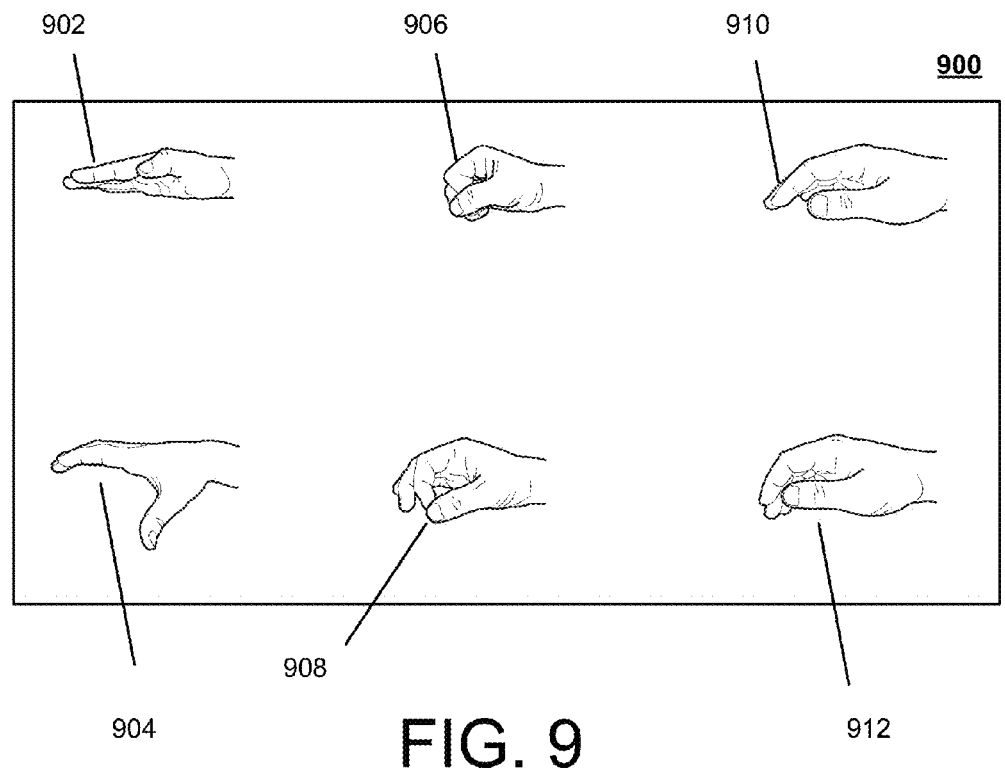
FIG. 9 illustrates example hand postures of an actor.

FIG. 9 illustrates example hand postures of an actor. For example, actors 502 may naturally use their hands to "trace" large surfaces, i.e. moving their flat hands along those surfaces, as if wiping them with their hands (e.g., table 722, top of surface, seats of chairs, cone 718). For example, actors 502 may naturally wipe the area within surface boundaries to "fill" it, as shown by a flat hand posture 902. As shown in FIG. 9, a curved hand posture 904 may be naturally used to describe a curved surface, while clenched hand postures 906 and 908 may be naturally used to describe struts and legs. Relaxed hand postures 910 and 912 may be naturally used when not tracing a surface.

For example, actors 502 may naturally specify the outline of medium surfaces with their flat hands (e.g., hand posture 902) and wipe the enclosed area with their hand to "fill" it (e.g., monitor, backrest of an office chair). For example, actors 502 may naturally abstract those medium surfaces to a mere stroke of their flat hand (e.g., hand posture 902), which they may indicate repeatedly (e.g., for chairs). For example, actors 502 may naturally describe a surface only by waving their hand repeatedly, roughly in the place of a surface (e.g., monitor, seats). For example, actors 502 may naturally use their hand to "trace" smaller components of objects (e.g., steps of a ladder, outside frame of a ladder).

For example, for changing shapes, actors 502 may naturally adapt the shape of their hand to match a curved surface and "wipe" up and down its surface repeatedly. The actors 502 may form a closed circle with both thumbs and index fingers (e.g., forming an enclosed space, as discussed above) and move their hands down, thereby driving them apart, the fingers thereby maintained the original shape (e.g., hand posture 904).

For example, actors 502 may naturally move both hands symmetrically and simultaneously for describing symmetry with regard to smaller components. With regard to bars, struts, and legs, actors 502 may naturally form a first (e.g., hand posture 906) and move it along the bar to represent a straight bar (e.g., legs of a table, tripod, chair, pole of an office chair). For example, actors 502 may naturally pinch their thumb and index fingers and move them along the bar (e.g., hand posture 908).

For bigger struts, example actors 502 may bring their hands to a close distance, hold them parallel or connect fingers and palms of both hands to enclose the space between the hands, and move both hands to trace the shape of a component (e.g., pole and legs of chairs, monitor stand). For example, actors 502 may naturally ignore complex shapes such as complex feet of chairs, or may abstract them to single primitive shapes.

Generally, example actors 502 may begin describing an object spatially in a top-down fashion. They may abstract the form of the object, may specify large components and faces first, and may finally describe some of the characteristic, but smaller components. For example, an actor 502 may naturally indicate armrests, poles and feet of office chairs, while neglecting descriptions of supports of armrests or bars connecting a backrest to a seat. Similarly, example actors 502 may describe a ladder by indicating all steps of the ladder and then highlighting its outer frame.

For example, actors 502 may naturally describe those parts first that most clearly represent the function of the object (e.g., backrest and seat of chairs, steps of a ladder, table top). They may then naturally describe the parts that hold the object together. For example, actors 502 may naturally make use of symmetric appearances whenever possible; they may use both hands with mirrored gestures to describe the shape. Likewise, they may use both hands to specify dimensions, either by defining constraining planes or "drawing" the bounding box. The actual dimensions of medium- and small-sized surfaces may seem unimportant to actors 502 in their spatial descriptions, and may thus be ignored in their natural gesturing.

For example, actors 502 may naturally adapt the shape of their hand to that of the described object or component, stretching (e.g., to describe a planar surface, hand posture 902) or curling and bringing together fingers (e.g., for a round surface, hand posture 904) as deemed desirable. In contrast, actors 502 may relax their hands and allow them to assume their natural posture (e.g., hand postures 910, 912) when moving their hands to the next part of an object.

For smaller components of an object, such as bars and stands, example actors 502 may either form a first (e.g., hand posture 906) or pinch their thumb and index finger (e.g., hand posture 908) to indicate both round and squared bars, along whose shape they may then move the hand. They may thereby ignore the actual diameter of those bars, using hand motion to indicate the shape of such bars.

While example actors 502 may vary hand yaw and roll, they may vary hand pitch only when indicating parallel parts by a vertical pose (e.g., as shown in FIG. 8C), due to the limited range of angles for hand pitch. When the hand is vertical, however, moving the elbow may extend this range. In contrast, hand roll and yaw may cover a larger range; elbow movement may also support the range of hand yaw.

In addition to stretching the hand to indicate activity as mentioned above, example actors 502 may deliberately describe parts of an object more slowly, while moving their hands faster when transitioning to another part. For smaller surfaces, they may dwell in one position for a brief amount of time. For larger surfaces, example actors 502 may repeatedly describe the surface and may describe the surface more carefully than when moving their hands to another part.

When two components may be closely collocated, example actors 502 may not dwell between components, but may instead treat them as a compound part and change hand orientation while they move their hands (e.g., connected backrest and seat of a chair). The compound component may be repeatedly indicated through gestures.

The observations discussed above may provide a basis, for example, for translating observed gestures, as they occur, into features of a virtual representation that seeks to reproduce an actor's mental image. In particular, example techniques as discussed herein may not rely on predefined gestures that manifest themselves as a particular part of an object upon recognition. According to an example embodiment, the actor's hands may provide the basic focus when expressing gestures. According to an example embodiment, position and posture of the actor's arms and body may be ignored and focus may be directed entirely to the actor's hands.

For example, actors 502 may naturally trace an object's surfaces and structural elements, thereby recreating the object based on their spatial memory, suggesting that the virtual representation of the actor's description may also build up over time. According to an example embodiment, those parts that the actor 502 has spent more time describing may be weighted more strongly than parts he/she may have covered only briefly.

Since example actors 502 may describe surfaces of different sizes by waving their hand in the respective area, an actor's hand may create a trace in the virtual representation. Since the actual path of the gesture may provide less information regarding the object, the position and orientation of the actor's hands may be used as a focus for translating motions correctly. In conjunction with a time-aware sensing of gestures, such traces may add more meaning to the virtual representation as the actor 502 repeatedly or more slowly covers a certain part of the object.

According to an example embodiment, focus may be directed to entities other than other than the hands of an actor. For example, an actor may assume a perceived shape of a 3-D item. According to an example embodiment, the description of the 3-D item may be inferred, for example, based on a length of time spent by the actor assuming the perceived shape of the 3-D item.

According to an example embodiment, the actor may spatially describe a 3-D item via a 3-D moving object associated with the actor. For example, the actor may grasp a 3-D object (e.g., a book, laptop, mobile phone) and move the 3-D object in natural gesturing motions to describe the shape of the desired 3-D item. As another example, the actor may don or attach sensing devices (e.g., gloves, gaming gear) and gesture a description of the shape of the desired 3-D item.

Figure 10A:
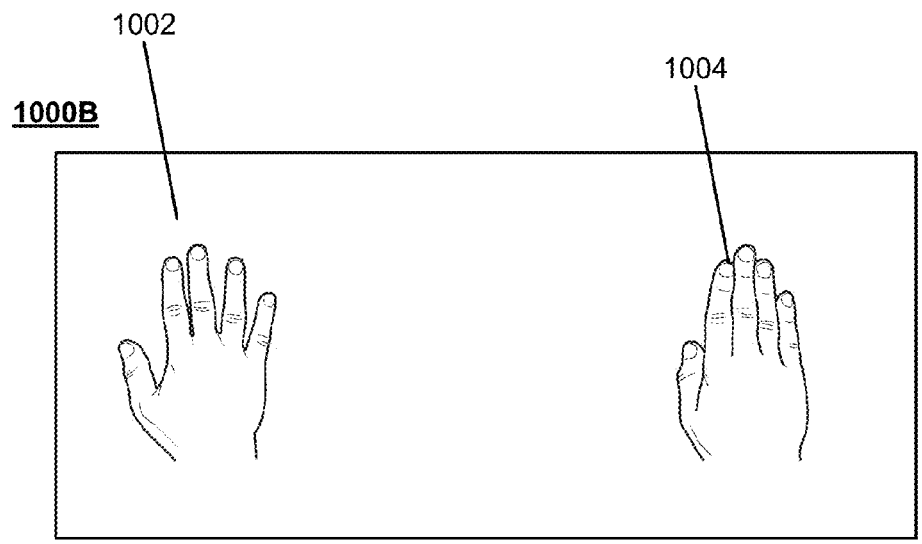
FIGS. 10A-10B illustrate example hand postures of an actor.
Figure 10B:
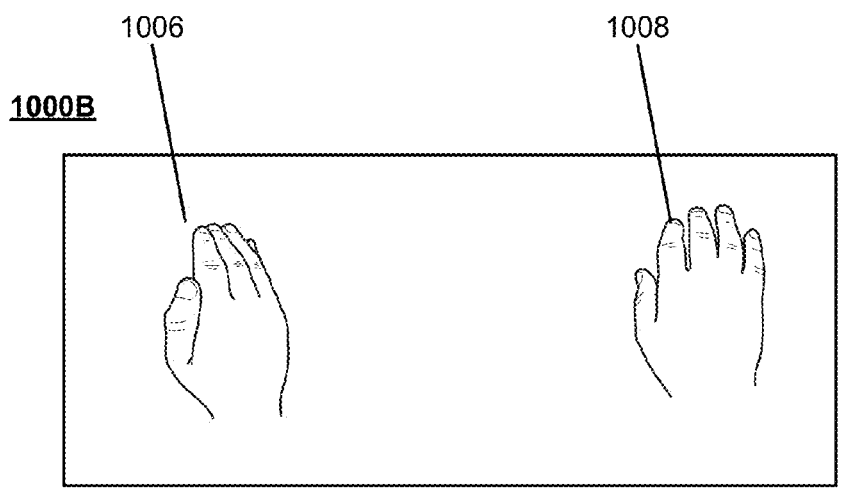

FIGS. 10A-10B illustrate example hand postures of an actor. As shown in FIG. 10A, a stretched hand posture 1002 may indicate a shape (e.g., flat surface). A stretched hand, fingers together posture 1004 may also show an intention to indicate a shape. A curved hand shape and fingers together hand posture 1004 may suggest that this motion is meaningful, and a relaxed pose 1008 may indicate a transitioning (e.g., similarly as discussed with regard to hand postures 910, 912).

According to an example embodiment, an example technique may recognize and translate only the meaningful parts of an actor's gesture, while ignoring motions that only serve to transition the hands to the next part of the object. For example, an example actor 502 may briefly relax his/her muscles while moving the hands to another part of the object, whereas he/she may align or stretch his/her fingers, or flex the hand muscles to signal a meaningful hand pose. It may be desirable to capture this distinction; however, changes in finger postures and curvature may be fairly subtle, as shown in FIGS. 10A-10B.

Considering potential concerns of sensing muscle relaxation with a camera, example data miming or gesturing techniques may forgo the interpretation of finger curvature. For each moment in time, the actor's hands may leave a footprint in the virtual representation (e.g., the spatial representation 138 and/or the integrated model 144) whose position and orientation corresponds to those of the actor's hands in the real world. In other words, the orientation and posture of the hand at each instant in time may determine a volume of the component added to the virtual representation (i.e., a flat, tilted hand may make a flat, slanted small-sized impact on the virtual representation). According to an example embodiment, these concepts may be extended to 3-D objects other than actors' hands, as discussed further herein.

According to an example embodiment, by replicating the volumes of the actor's hands and representing them in the virtual space, example techniques discussed herein may sense flat and curved hand postures (e.g., flat surfaces, surface of a sphere) and may also account for smaller elements when actors 502 form a first or pinch their fingers (e.g., for legs of a chair). Further, both hands may be considered separately.

According to an example embodiment, data miming techniques, or gesturing techniques discussed herein may generate a virtual representation of the actor's description in a discretized 3-D volume embodying l×m×n voxels (e.g., the generated integrated model 144). This voxel space may thus represent a virtual representation "memory" of the object description system. Each voxel may be in either an active or inactive state. According to an example embodiment, a scene may be initiated with only inactive voxels and over the course of observing the actor's gestures, voxels may be activated as appropriate. According to an example embodiment, each voxel may also be associated with a certain weight, which may be increased as the actor repeatedly activates the voxel, as discussed above. Thus, it may be possible to capture how actors slowly or repeatedly trace the most meaningful parts of the object, as the set of voxels above a certain weight may be interpreted to represent the meaningful parts of the actor's description, while the rest may be ignored.

According to an example embodiment, the example 3D-scene techniques discussed herein may be world-anchored, such that a location and orientation of the scene may not adapt to the actor's position or orientation. Thus, while the center of the scene may be in front of the actor 502 (i.e., world anchored), actors 501 may be able to maintain this spatial anchor, as 3-D object descriptions may be completed in as little as a few seconds.

According to an example embodiment, an identity of an actor-described object may be determined based on an example database of matching candidate objects in voxel representation (e.g., the database 172). According to an example embodiment, data miming techniques, or gesturing techniques discussed herein may select the most closely matching object from the database. As discussed herein, for each candidate object, the generated 3-D model (e.g., the integrated model 144) may be aligned with the predefined database model (e.g., the predefined 3-D models 168a, 168b, 168c) for comparison and measurement of similarity. Further, the scale and rotation difference from the actor's creation may be obtained.

As objects may be substantially assembled based on characteristic components, actors 502 may describe such characteristic parts separately. As humans may generally make implicit assumptions about their audience, they may not describe less significant parts that may seem implicitly fundamental to a structure (e.g., connecting parts between surfaces, such as a backrest and seat in a chair) or features that do not serve to further aid in identifying an object.

According to an example embodiment, such a fragmentary modeling on the actor's part may be reflected in the matching process by allowing the actor to omit any part of the object, trusting that the actor will naturally specify enough detail given some familiarity with the class of objects under consideration and the variability of shape within that class.

Furthermore, according to an example embodiment, an example data miming or gesturing technique may incorporate speech recognition to narrow the class of objects under consideration. For example, the actor 502 may say "chair"

and then specify a particular chair by gesturing to indicate an identifying feature (or set of features) of the chair's shape.

According to an example embodiment, the example system 100 discussed herein may be implemented on an end-user system, and with a single depth-sensing camera (e.g., the image data input device 112) that may be mounted above the actor 132. For example, a MICROSOFT KINECT camera may provide depth images at 30 Hz and a resolution of 640×480. For example, the camera may have a diagonal field-of-view of 70°. According to an example embodiment, an example system 100 may process each camera frame in less than 15 ms, thus providing real-time processing of the actor's gestures and translation into voxel representation.

Figure 11A:
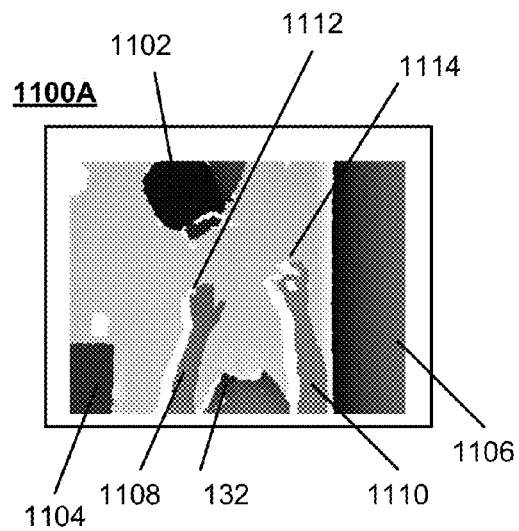
FIGS. 11A-11D illustrate a graphical view of example processing of image data in accordance with the example system of FIG. 1.

FIGS. 11A-11D illustrate a graphical view of example processing of image data in accordance with the example system of FIG. 1. According to an example embodiment, an example technique discussed herein may process a raw image 1100A as discussed below. As shown in FIG. 11A, a camera 1102, a chair 1104, and a table 1106 may appear in the raw image 1100A along with the actor's (e.g., actor 132) arms 1108, 1110, and hands 1112, 1114.

Figure 11B:
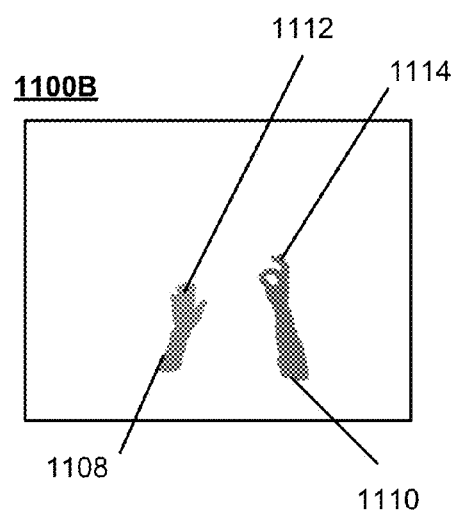

According to an example embodiment, each picture element (pixel) in the input image 1100A may be transformed into world coordinates. As shown in FIG. 11B, coordinates (i.e., pixels) outside a volume of 3 feetW×2 feetH×2.5 feetD may then be cropped, thus removing the floor, walls, and potential other objects from the depth image 1100B (e.g., the chair 1104 and table 1106 in FIG. 11A).

Figure 11C:
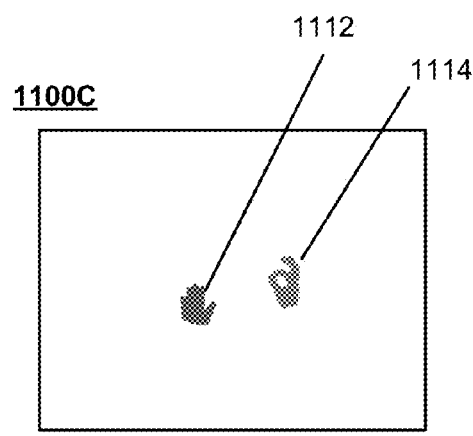

According to an example embodiment, the arms 1108, 1110 in the image 1100B may be identified, distinguishing between contiguous regions with only gradually changing depth values so as to account for overlapping arms, and the actor's hands 1112, 1114 may be extracted by removing the arms 1108, 1110, as shown in FIG. 11C.

Based on an assumption that the actor's arms 1108, 1110 may enter from outside and reach into the volume, an example technique may determine a most-distant point of each hand 1112, 1114, measuring distance as the length of a path within the shape of the arm 1108, 1110 (i.e., not Euclidean distance for this example), to account for bent elbows and wrists. According to an example embodiment, to extract the actor's hands 1112, 1114, a constant hand length (depending on the distance to the camera), may be used. According to an example embodiment, a calibration may be applied for an actor's particular hand size.

According to an example embodiment, the orientation and volume of both hands 1112, 1114 may be calculated by tracking the visible area of each hand 1112, 1114 over time. According to an example embodiment, the roll and pitch angle of each hand 1112, 1114 may be calculated from the changes in depth values across the visible area. According to an example embodiment, if the visible area is too small, such as for vertical hand roll (e.g., only thumb and index finger are visible top-down), an example technique may estimate based on prior observations how much of the hand 1112, 1114 may be occluded, and may determine the hand orientation accordingly.

According to an example embodiment, calculation of the yaw angle of each hand 1112, 1114 may be straightforward considering the camera 1102 may be mounted above the actor's head. According to an example embodiment, from the observations over time, the posture of each hand in 3-space may be reconstructed, as well as its precise extents in the z-axis (i.e., the axis of line-of-sight of the camera 1102).

According to an example embodiment, after calculating the orientation of the hands 1112, 1114, an example technique may then directly translate the position and orientation of each hand 1112, 1114 into locations of voxels in the voxel space. According to an example embodiment, this may include activating all voxels in an area that has the same depth, location, and orientation as the actor's hand 1112, 1114, as discussed above.

Figure 11D:
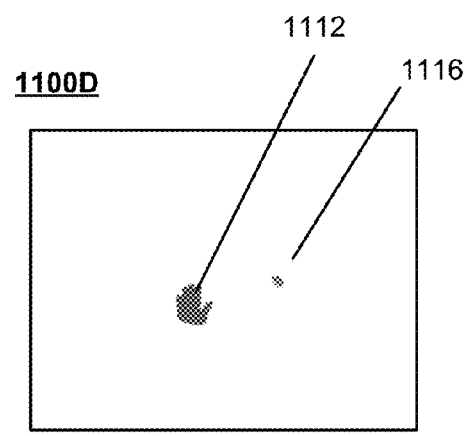

According to an example embodiment, an example technique may detect an actor's intentions to create finer elements by pinching his/her fingers and thumb together or moving both hands together. As shown in FIG. 11D, as soon as such an enclosed region 1116 is detected (e.g., via the enclosure detection engine 158), this region (as opposed to the hand 1114) may be processed. According to an example embodiment, the depth values for the region 1116 may be sampled from the surrounding area (i.e., the hand 1114). Voxels may thus be activated if they share a location with the enclosed region 1116. According to an example embodiment, the actual shape of the hand 1114 may be dismissed if it encloses a region (e.g., region 1116). Therefore, actors 132 may indicate thinner elements, such as table legs or tripod struts. Similar techniques may be applied if the actor 132 connects both thumbs and index fingers, thereby enclosing a bigger area.

According to an example embodiment, a voxel space may be implemented as a three-dimensional array of positive numbers, thus representing a 3-D histogram. According to an example embodiment, each voxel may have a constant width, height, and depth (e.g., 10 mm). According to an example embodiment, a center of the voxel space may be placed directly in front of the actor 132, roughly at torso level (e.g., as shown in FIG. 11A).

According to an example embodiment, activating a voxel may increase its count in the histogram, thus implying that voxels through which the actor 132 passes repeatedly or more slowly (i.e., meaningful parts of the object description) may accumulate a higher count than voxels the actor 132 passes through when moving the arms 1108, 1110 to the next, meaningful location. According to an example embodiment, simple thresholding across all voxels in the space may then leave the meaningful and relevant parts of the object description. For example, the integrated model generator 140 may generate the integrated 3-D model 144 based on incrementally integrating the 3-D spatial map data included in the determined sequential 3-D spatial representations 138 and comparing the threshold time value 146 with model time values indicating numbers of instances of time spent by the at least one hand occupying a plurality of 3-D spatial regions during the free-form movements, as discussed above.

According to an example embodiment, an example iterative alignment technique may employ an example iterative closest point (ICP) algorithm to register two models (e.g., the generated integrated model 144 and one of the pre-defined 3-D models 168a, 168b, 168c). For example, the ICP algorithm may be initiated after both models have been pre-aligned (e.g., by scaling, translating, and rotating to at least match selected components). According to an example embodiment, the preliminary alignment may further adapt the scale of both models uniformly. For example, the iterative alignment engine 188 may generate the second alignment 190 of the one of the predefined 3-D models 168a, 168b, 168c and the integrated 3-D model 144 based on an iterative closest point algorithm, as discussed above.

According to an example embodiment, the ICP algorithm may be based on iteratively matching points in one model to the closest points in the other. For example, a statistical technique based on a distance distribution may be employed for processing outliers, occlusion, appearance and disappearance, which provides example techniques associated with subset-subset matching. An example least-squares technique may be employed to estimate 3-D motion from the point correspondences, which may reduce the average distance between points in the two models.

Alternatively, an example brute force technique may test four levels of quarter-rotation around the z-axis (vertical) and any combination of translations within 16 cm×16 cm×16 cm. According to an example embodiment, rotations around x and y (horizontal) may be ignored, as actors 132 may maintain an object's orientation around those axes, while they may "turn" objects towards them during their spatial description (i.e., they may rotate about the z axis). The number of z rotations for this example technique may correspond to the number of vertical faces in an object (e.g., four faces). This example technique may also pre-align both models and adapt their scale uniformly. For example, the brute force alignment engine 192 may generate the second alignment 190 of the one of the predefined 3-D models 168a, 168b, 168c and the integrated 3-D model 144 based on a brute force alignment that includes a plurality of scales, rotations, and translations of the one of the predefined 3-D models 168a, 168b, 168c and the integrated 3-D model 144, based on the first alignment 186, as discussed above.

According to an example embodiment, an example ICP technique may be computationally expensive and may involve approximate times of 8 seconds to compare two models, an example brute force technique may involve less than one second for the comparison, as the brute force technique may operate in the discrete voxel space (i.e., looking up voxels may involve relatively fast operations). However, an example ICP technique may provide more flexibility in that it may rotate the objects around all three axes to determine one or more closest matches.

While at least two different techniques to match objects represented in voxel spaces are discussed herein, one skilled in the art of data processing may appreciate that there are many other matching techniques available that may be used for matching the generated integrated model 144 with one or more of the predetermined 3-D models 1681, 168b, 168c, without departing from the spirit of the discussion herein.

Figure 12:
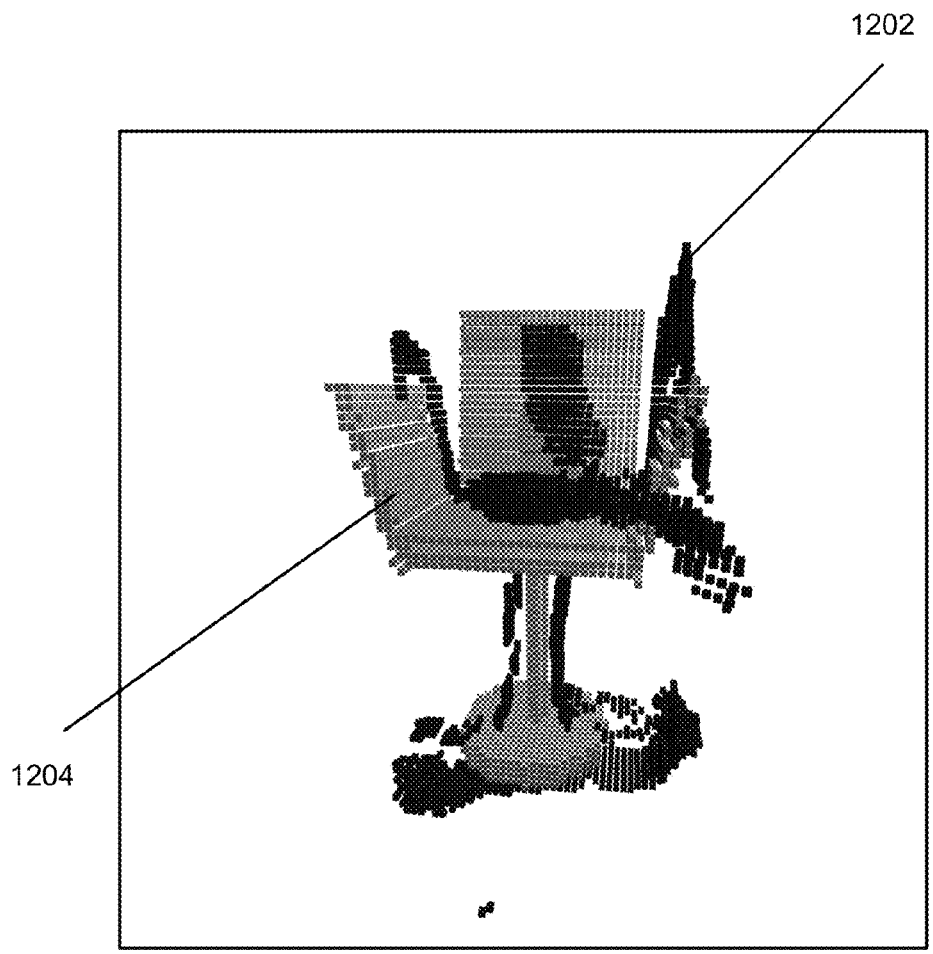
FIG. 12 illustrates an example superimposed result of matching of a generated 3-D model with a predetermined 3-D model.

FIG. 12 illustrates an example superimposed result of matching of a generated 3-D model with a predefined 3-D model. As shown in FIG. 12, a generated 3-D model 1202 is matched with a predefined model 1204, based on example matching techniques discussed herein. For example, the actor 132 may envision a chair having a disk-shaped foot (e.g., similar to the chair 708) and may spatially describe (e.g., via data miming gestures) features of the chair in range of an example image data input device 112 (e.g., a depth camera). An example spatial object management engine 102 may receive the spatial image data 110 from the image data input device 112, and the integrated model generator 140 may generate the integrated model 144 (e.g., the generated model 1202). The matching engine 166 may then match the integrated model 144 with one of the predefined 3-D models 168 to select the selected model 194 (e.g., the predefined model 1204), as discussed above.

According to an example embodiment, the example system 100 may be implemented by capturing interaction with the actor 132 via a depth camera such as a MICROSOFT KINECT camera. According to an example embodiment, a video of the gestures of the actor 132 may be recorded at a resolution of 640×480 pixels with depth information at 30 Hz. For example, the spatial object management engine 102 may be implemented via a computing device running WINDOWS 7 Ultimate, powered by an INTEL CORE2 Duo 2.13 GHz processor and 6 GB of random access memory (RAM).

According to an example embodiment, an example matching technique may employ a closest-three technique, wherein the actor 132 may spatially describe an object via gestures, whereupon the system 100 may provide three most-closely matching objects 170a, 170b, 170c from the database 172. The actor 132 or user 124 may then select one of the three choices, may start over, or may choose to continue to provide more detail via gesturing, as it may be apparent that they have underspecified the object. According to an example embodiment, the closest-three results may also be consumed by a larger system that may model a context of the interaction (e.g., spoken dialogue). This extra information may provide a disambiguation of the actor's input (e.g., conversely, gesture may disambiguate other aspects of the interaction such as speech).

Example techniques discussed herein may involve concrete 3-D models stored in a database (e.g., the predefined 3-D models 168a, 168b, 168c stored in the database 172). These models may be matched against a similarly represented input (e.g., the generated integrated model 144) using a straightforward shape matching approach which may not be informed by the nature of human gesture. Thus, adding an object to the database 172 (e.g., the update model 180) may involve obtaining only a 3-D model of the object.

According to an example embodiment, items other than hands of the actor 132 may be used for spatially describing an object to obtain the generated integrated model 144. For example, in robotics applications, an end-effector may include a device at the end of a robotic arm, designed to interact with an environment. Thus, for example, such an end-effector (e.g., in the context of a human hand environment instead of robotic appendages) may be used in lieu of human hands for spatial descriptions. Further, if an actor's hands are occupied (e.g., holding a book, holding a mobile device), an object held by the hands may be tracked by the example system 100 in lieu of hands of the actor 132. For example, if the actor 132 has no hands available for gesturing, other objects may be used, without departing from the spirit of the discussion herein.

Further, sensing devices other than image data input devices 112 may be used for obtaining the sensor data 106, as discussed above. For example, sensing gloves may be employed for capturing hand postures as the actor 132 gestures while wearing the sensing gloves.

Example techniques discussed herein may provide an example approach to making sense of gestures as they may be used, for example, to describe concrete physical objects. According to an example embodiment, and as discussed herein, example data miming or gesturing techniques may be based on a volumetric pixel or picture element (voxel) representation of a space traced by the hands of the actor 132 over the duration of the gesture. According to an example embodiment, 3-D model matching techniques may be employed for matching the input voxel representation to select among a database 172 of known physical objects (e.g., physical objects that maybe associated with the predefined 3-D models 168a, 168b, 168c).

Implementations of the various techniques described herein may be implemented in digital electronic circuitry, or in computer hardware, firmware, software, or in combinations of them. Implementations may implemented in a propagated signal, or, alternatively, as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one device processor; and
   a machine readable storage device storing executable instructions that, when executed, cause the at least one device processor to:
   receive, from one or more cameras, three-dimensional (3-D) spatial image data associated with at least one arm motion of an actor based on free-form movements of at least one hand of the actor, based on natural gesture motions of the at least one hand;
   determine a plurality of sequential 3-D spatial representations that each include 3-D spatial map data corresponding to a 3-D posture and position of the at least one hand at sequential instances of time during the free-form movements, based on the received 3-D spatial image data; and
   generate an integrated 3-D model based on incrementally aggregating the 3-D spatial map data included in the determined sequential 3-D spatial representations and comparing a threshold time value with model time values indicating numbers of instances of time spent by the at least one hand occupying a plurality of 3-D spatial regions during the free-form movements.

2. The system of claim 1, wherein the executable instructions, when executed, cause the at least one device processor to:
   determine a volume associated with the at least one hand of the actor based on the received 3-D spatial image data;
   determine a 3-D representation of the at least one hand in a 3-D virtual map space based on the determined volume; and
   determine at least one hand posture based on the 3-D representation of the at least one hand.

3. The system of claim 2, wherein the executable instructions, when executed, cause the at least one device processor to:
   determine whether the at least one hand posture of the at least one hand indicates a 3-D enclosed space, wherein
   generating the integrated 3-D model includes:
   if it is determined that the enclosed 3-D space is indicated, activate a plurality of volumized elements associated with portions of the integrated 3-D model that represent a depth, location, and orientation corresponding to the enclosed space, for sequential instances of time associated with the posture indicating the enclosed space, and otherwise,
  activate a plurality of the volumized elements associated with portions of the integrated 3-D model that represent a depth, location, and orientation corresponding to a depth, location, and orientation of the at least one hand.

4. The system of claim 2, wherein the executable instructions, when executed, cause the at least one device processor to:
  determine that the at least one hand posture includes one or more of a flat hand posture, a curved hand posture, a hand clinched as a fist, or a hand postured with pinched fingers.

5. The system of claim 1, wherein the executable instructions, when executed, cause the at least one device processor to:
  initiate access to a database including a plurality of database objects, each database object associated with a predefined three-dimensional (3-D) model that simulates an appearance of a predetermined 3-D item;
  determine at least one of the predefined 3-D models associated with at least one database object that matches the integrated 3-D model, wherein
  the natural gesture motions emulate an appearance of a predetermined three-dimensional (3-D) item.

6. The system of claim 5, wherein the executable instructions, when executed, cause the at least one device processor to:
  obtain an update 3-D model that simulates an appearance of a predefined update 3-D item; and
  initiate storage, in the database, of an update database object associated with the update 3-D model.

7. The system of claim 1, wherein the executable instructions, when executed, cause the at least one device processor to:
  determine a volume associated with the at least one hand of the actor based on tracking visible portions of the at least one hand over time, based on the received 3-D spatial image data;
  determine a yaw angle of the at least one hand based on a rotation of the tracked visible portions of the one of the hands in a top-down, view, based on the received 3-D spatial image data; and
  determine a roll angle and a pitch angle of the at least one hand based on variations in depth values associated with the tracked visible portions.

8. A method comprising:
  receiving, from one or more cameras, three-dimensional (3-D) spatial image data associated with at least one arm motion of an actor based on free-form movements of at least one hand of the actor, based on natural gesture motions of the at least one hand;
  determining, via at least one device processor, a plurality of sequential 3-D spatial representations that each include 3-D spatial map data corresponding to a 3-D posture and position of the at least one hand at sequential instances of time during the free-form movements, based on the received 3-D spatial image data; and
  generating, via at least one device processor, an integrated 3-D model based on incrementally aggregating the 3-D spatial map data included in the determined sequential 3-D spatial representations and comparing a threshold time value with model time values indicating numbers of instances of time spent by the at least one hand occupying a plurality of 3-D spatial regions during the free-form movements.

9. The method of claim 8, further comprising:
  determining a volume associated with the at least one hand of the actor based on the received 3-D spatial image data;
  determining a 3-D representation of the at least one hand in a 3-D virtual map space based on the determined volume; and
  determining at least one hand posture based on the 3-D representation of the at least one hand.

10. The method of claim 9, further comprising:
  determining, via at least one device processor, whether the at least one hand posture of the at least one hand indicates a 3-D enclosed space, wherein
  generating the integrated 3-D model includes:
  if it is determined that the enclosed 3-D space is indicated,
    activating a plurality of volumized elements associated with portions of the integrated 3-D model that represent a depth, location, and orientation corresponding to the enclosed space, for sequential instances of time associated with the posture indicating the enclosed space, and
  otherwise,
    activating a plurality of the volumized elements associated with portions of the integrated 3-D model that represent a depth, location, and orientation corresponding to a depth, location, and orientation of the at least one hand.

11. The method of claim 9, further comprising:
  determining that the at least one hand posture includes one or more of a flat hand posture, a curved hand posture, a hand clinched as a fist, or a hand postured with pinched fingers.

12. The method of claim 8, further comprising:
  initiating access to a database including a plurality of database objects, each database object associated with a predefined three-dimensional (3-D) model that simulates an appearance of a predetermined 3-D item;
  determining, via at least one device processor, at least one of the predefined 3-D models associated with at least one database object that matches the integrated 3-D model, wherein
  the natural gesture motions emulate an appearance of a predetermined three-dimensional (3-D) item.

13. The method of claim 12, further comprising:
  obtaining an update 3-D model that simulates an appearance of a predefined update 3-D item; and
  initiating storage, in the database, of an update database object associated with the update 3-D model.

14. The method of claim 8, further comprising:
  determining a volume associated with the at least one hand of the actor based on tracking visible portions of the at least one hand over time, based on the received 3-D spatial image data;
  determining a yaw angle of the at least one hand based on a rotation of the tracked visible portions of the one of the hands in a top-down view, based on the received 3-D spatial image data; and
  determining a roll angle and a pitch angle of the at least one hand based on variations in depth values associated with the tracked visible portions.

15. A computer program product that includes a hardware machine readable storage device storing executable instructions that, when executed, cause at least one device processor to:
  receive, from one or more cameras, three-dimensional (3-D) spatial image data associated with at least one arm motion of an actor based on free-form movements of at least one hand of the actor, based on natural gesture motions of the at least one hand;

determine a plurality of sequential 3-D spatial representations that each include 3-D spatial map data corresponding to a 3-D posture and position of the at least one hand at sequential instances of time during the free-form movements, based on the received 3-D spatial image data; and generate an integrated 3-D model based on incrementally aggregating the 3-D spatial map data included in the determined sequential 3-D spatial representations and comparing a threshold time value with model time values indicating numbers of instances of time spent by the at least one hand occupying a plurality of 3-D spatial regions during the free-form movements.

16. The computer program product of claim 15, wherein the executable instructions, when executed, cause the at least one device processor to:

determine a volume associated with the at least one hand of the actor based on the received 3-D spatial image data;

determine a 3-D representation of the at least one hand in a 3-D virtual map space based on the determined volume; and determine at least one hand posture based on the 3-D representation of the at least one hand.

17. The computer program product of claim 16, wherein the executable instructions, when executed, cause the at least one device processor to:

determine whether the at least one hand posture of the at least one hand indicates a 3-D enclosed space, wherein generating the integrated 3-D model includes:

if it is determined that the enclosed 3-D space is indicated, activate a plurality of volumized elements associated with portions of the integrated 3-D model that represent a depth, location, and orientation corresponding to the enclosed space, for sequential instances of time associated with the posture indicating the enclosed space, and otherwise, activate a plurality of the volumized elements associated with portions of the integrated 3-D model that represent a depth, location, and orientation corresponding to a depth, location, and orientation of the at least one hand.

18. The computer program product of claim 16, wherein the executable instructions, when executed, cause the at least one device processor to:

determine that the at least one hand posture includes one or more of a flat hand posture, a curved hand posture, a hand clinched as a fist, or a hand postured with pinched fingers.

19. The computer program product of claim 15, wherein the executable instructions, when executed, cause the at least one device processor to:

initiate access to a database including a plurality of database objects, each database object associated with a predefined three-dimensional (3-D) model that simulates an appearance of a predetermined 3-D item;

determine, via the spatial object processor, at least one of the predefined 3-D models associated with at least one database object that matches the integrated 3-D model, wherein the natural gesture motions emulate an appearance of a predetermined three-dimensional (3-D) item.

20. The computer program product of claim 19, wherein the executable instructions, when executed, cause the at least one device processor to:

obtain an update 3-D model that simulates an appearance of a predefined update 3-D item; and initiate storage, in the database, of an update database object associated with the update 3-D model.

\* \* \* \* \*